(12) United States Patent
Sykes et al.

(10) Patent No.: US 12,440,995 B1
(45) Date of Patent: Oct. 14, 2025

(54) VIRTUAL BARRIERS FOR REMOTELY OPERATED EQUIPMENT

(71) Applicant: Altec Industries, Inc., Birmingham, AL (US)

(72) Inventors: Jonathan Westin Sykes, Gower, MO (US); Timothy J. Mourlam, Shawnee, KS (US); Robert Nichols, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/967,103

(22) Filed: Dec. 3, 2024

(51) Int. Cl.
| | |
|---|---|
| *B25J 9/16* | (2006.01) |
| *B25J 13/08* | (2006.01) |
| *G02B 27/01* | (2006.01) |
| *G06F 3/01* | (2006.01) |
| *G06V 10/70* | (2022.01) |

(52) U.S. Cl.
CPC ........... *B25J 9/1689* (2013.01); *B25J 9/1666* (2013.01); *B25J 13/089* (2013.01); *G02B 27/017* (2013.01); *G06F 3/016* (2013.01); *G06V 10/70* (2022.01)

(58) Field of Classification Search
None
See application file for complete search history.

(56) References Cited

U.S. PATENT DOCUMENTS

| | | | |
|---|---|---|---|
| 5,822,891 A * | 10/1998 | Fujishima | E02F 9/2033 701/50 |
| 11,660,750 B1 | 5/2023 | Sykes et al. | |
| 11,689,008 B1 | 6/2023 | Nichols et al. | |
| 11,697,209 B1 | 7/2023 | Mourlam et al. | |
| 11,717,969 B1 | 8/2023 | Mourlam et al. | |
| 11,742,108 B1 | 8/2023 | Naber et al. | |
| 11,749,978 B1 | 9/2023 | Lindquist et al. | |
| 11,794,359 B1 | 10/2023 | Sykes et al. | |
| 11,839,962 B1 | 12/2023 | Nichols | |
| 11,997,429 B2 | 5/2024 | Sykes et al. | |
| 2001/0055525 A1 | 12/2001 | Inokuchi et al. | |
| 2016/0171862 A1* | 6/2016 | Das | G08B 21/02 340/686.1 |
| 2018/0057318 A1* | 3/2018 | Benton | B66C 13/063 |
| 2018/0179029 A1* | 6/2018 | Schoonmaker | B66C 23/905 |
| 2021/0107156 A1* | 4/2021 | Park | B25J 9/1666 |
| 2021/0331321 A1* | 10/2021 | Sykes | B25J 13/006 |
| 2022/0036302 A1 | 2/2022 | Cella et al. | |
| 2022/0347863 A1 | 11/2022 | Priest | |

(Continued)

OTHER PUBLICATIONS

U.S. Appl. No. 18/927,001 Non-Final Office Action issued Jan. 13, 2025.

*Primary Examiner* — Adam R Mott
*Assistant Examiner* — Alan Lindsay Ostrow
(74) *Attorney, Agent, or Firm* — Erise IP, P.A.

(57) ABSTRACT

Systems, methods, and computer-readable media for establishing and utilizing virtual barriers for remotely operated equipment. Remotely operated equipment may be used to perform operations within a remote operating environment based on control inputs from an operator at a distinct location from the remote operating environment. The virtual barriers are established within a control system of the remotely operated equipment to alert the operator or modify operation based on proximity of the remotely operated equipment to the virtual barriers.

18 Claims, 9 Drawing Sheets

(56) References Cited

U.S. PATENT DOCUMENTS

| | | | |
|---|---|---|---|
| 2023/0113312 A1* | 4/2023 | Junio | A61B 34/32 |
| | | | 700/255 |
| 2023/0168670 A1 | 6/2023 | von Reventlow et al. | |
| 2023/0255571 A1 | 8/2023 | Grajales | |
| 2024/0025049 A1* | 1/2024 | Zhu | B25J 9/1697 |
| 2024/0033916 A1 | 2/2024 | Sykes et al. | |
| 2024/0033925 A1* | 2/2024 | Mourlam | B25J 9/1679 |
| 2024/0033928 A1 | 2/2024 | Mourlam et al. | |
| 2024/0038413 A1 | 2/2024 | Naber et al. | |
| 2024/0039265 A1 | 2/2024 | Nichols et al. | |
| 2024/0160229 A1 | 5/2024 | Rana | |
| 2024/0166475 A1* | 5/2024 | Chettibi | B66C 13/46 |
| 2024/0372350 A1 | 11/2024 | Nichols et al. | |

\* cited by examiner

VIRTUAL BARRIERS FOR REMOTELY OPERATED EQUIPMENT

BACKGROUND

1. Field

Embodiments of the invention relate to remotely operated equipment. More specifically, embodiments of the invention relate to virtual barriers for remotely operated equipment.

2. Related Art

Remotely operated equipment may be used for various applications, such as power line maintenance, to remove human operators from hazardous or unreachable work environments. However, even when using remotely operated equipment, such as remotely operated robotic equipment, it may be desirable to avoid certain objects within the remote work environment.

SUMMARY

Embodiments solve the above-mentioned problems by providing systems, methods, and computer-readable media for automatically avoiding or alerting an operator of objects within a remote work environment.

In some aspects, the techniques described herein relate to a method of establishing virtual barriers within a control system of a remotely operated robotic device, the remotely operated robotic device disposed in a remote operating environment remote from an operator, the method including: identifying at least one position within the remote operating environment, the at least one position associated with an object in the remote operating environment; generating at least one virtual barrier associated with the object within the control system of the remotely operated robotic device based on the at least one position within the remote operating environment; generating an alert in response to a proximity of a portion of the remotely operated robotic device to the at least one virtual barrier; and selectively displaying a visual representation of the at least one virtual barrier to the operator as an overlay within an operator interface.

In some aspects, the techniques described herein relate to one or more non-transitory computer-readable media storing computer-executable instructions that, when executed by at least one processor, perform a method of establishing virtual barriers within a control system of a remotely operated robotic device, the remotely operated robotic device disposed in a remote operating environment remote from an operator, the method including: receiving one or more operator inputs from the operator, the one or more operator inputs indicative of at least one position within the remote operating environment, the at least one position associated with an object disposed in the remote operating environment; generating at least one virtual barrier within the control system of the remotely operated robotic device based on the at least one position within the remote operating environment, the at least one virtual barrier corresponding to the object disposed in the remote operating environment; generating an alert in response to a proximity of a portion of the remotely operated robotic device to the at least one virtual barrier; and selectively generating a visual representation of the at least one virtual barrier displayed to the operator as an overlay within an operator interface.

In some aspects, the techniques described herein relate to a method of establishing virtual barriers within a control system of a remotely operated robotic device, the remotely operated robotic device disposed in a remote operating environment remote from an operator, the method including: generating a first virtual barrier within the control system of the remotely operated robotic device, the first virtual barrier corresponding to a first object disposed in the remote operating environment; generating a second virtual barrier within the control system, the second virtual barrier corresponding to a second object disposed in the remote operating environment; generating one or more virtual equipment barriers within the control system, the one or more virtual equipment barriers corresponding to respective portions of the remotely operated robotic device; while the remotely operated robotic device is in a first electrical bonding state, monitoring position of the one or more virtual equipment barriers relative to the first virtual barrier as the respective portions of the remotely operated robotic device move within the remote operating environment; and while the remotely operated robotic device is in a second electrical bonding state, monitoring position of the one or more virtual equipment barriers relative to the second virtual barrier as the respective portions of the remotely operated robotic device move within the remote operating environment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
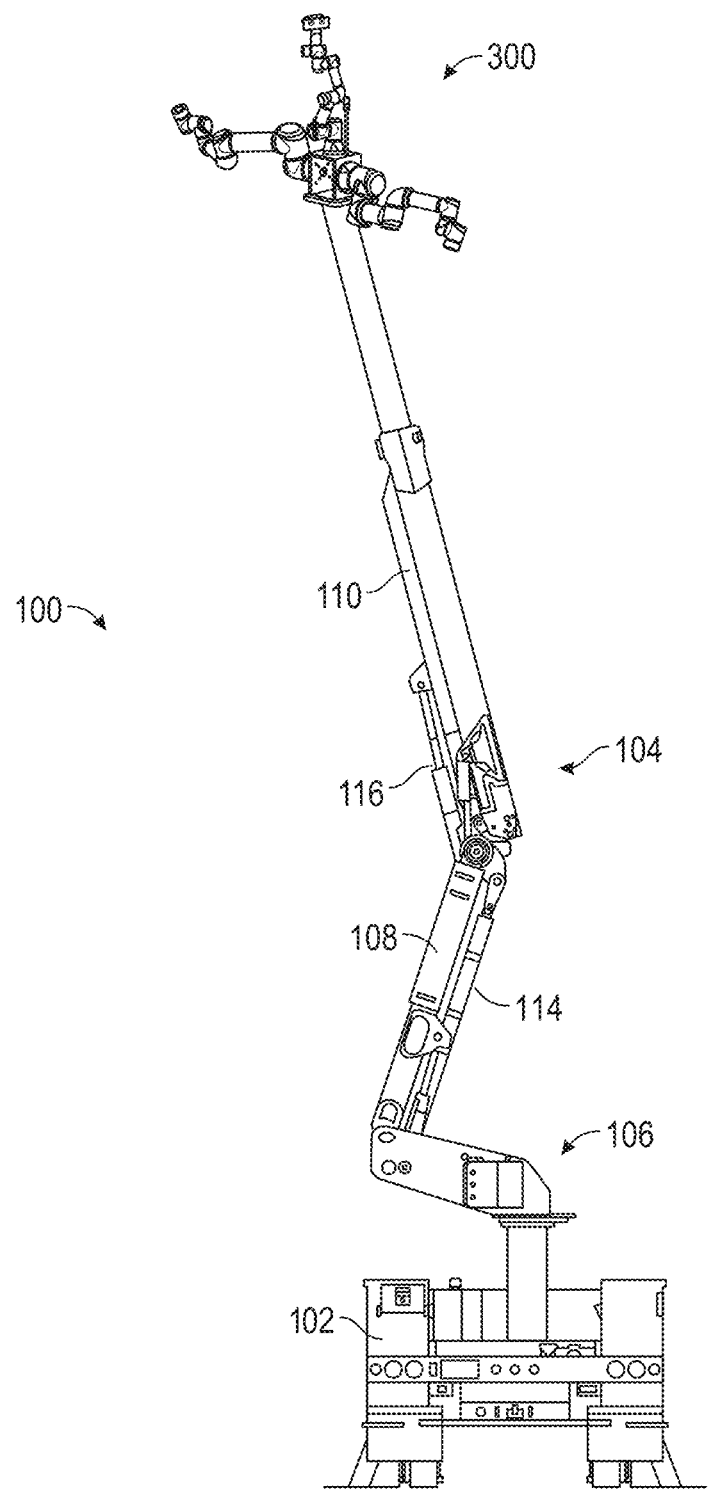
FIG. 1 depicts an aerial device with a robotic assembly disposed thereon relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to systems and methods for establishing and using virtual barriers within a remote operating environment of remotely operated robotic equipment. Virtual barriers, also referred to as virtual fences, provide a virtual spatial representation of regions relating to one or more objects within the remote operating environment, for example, to alert an operator or prevent one or more actions responsive to equipment proximity to other objects. As a specific example, a virtual barrier may be generated for an energized power line to prevent contact, arching, or damage to the remotely operated equipment associated with proximity to the energized power line while the remotely operated equipment is at a different electrical potential.

Remotely operated equipment, as referred to herein may refer to equipment and machinery, such as robotic equipment that is controlled manually, automatically, or using a combination of manual and automated control. For example, embodiments are contemplated in which a remotely operated device is controlled by an operator in a distinct location from the remote operating environment. Further, embodiments are contemplated in which control is automated with one or more automated techniques to aid and simplify operator control. Further still, in some embodiments, fully automated control of the remotely operated equipment is contemplated. Remotely operated equipment may also refer to other remotely operated machinery such as any of booms, cranes, or other utility equipment that is operated remotely by an operator in a distinct location or automatically. For example, in some embodiments, remotely operated equipment refers to a combination of a boom assembly and robotic equipment coupled to a boom tip of the boom assembly.

FIG. 1 depicts an aerial device 100 with a remote assembly system 300 disposed thereon relating to some embodiments. Aerial device 100 may be attached to utility vehicle 102, as shown. In some embodiments, aerial device 100 comprises a boom assembly 104 and a turntable 106 that may be disposed on utility vehicle 102, as shown. The boom assembly 104 may comprise a lower boom section 108 attached to the turntable 106 and an upper boom section 110 pivotably attached to an end of the lower boom section 108, as shown. In some embodiments, either or both of the lower boom section 108 and the upper boom section 110 may include a telescoping portion for telescopically extending and retracting the length of the boom assembly 104. Further, in some embodiments, a utility platform may be included, attached at a distal end of the upper boom section 110, as shown. Alternatively, or additionally, in some embodiments, a robotic assembly may be disposed at the distal end of the upper boom section 110, as will be described in further detail below.

In some embodiments, the aerial device 100 may be used for performing work on or near high-voltage power lines. As such, the aerial device 100 may be operated near electrically powered high-voltage cables. In some embodiments, utility platform and boom assembly 104 comprise insulating material for electrically insulating aerial device 100. Furthermore, any electrical components disposed in the utility platform and on boom assembly 104 may be self-contained and separate from the electrical components of utility vehicle 102. As such, a dielectric gap is created between utility platform and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and utility platform, as will be described in further detail below.

In some embodiments, the boom assembly comprises one or more cylinders for controlling motion of the boom assembly 104 such as a lower boom cylinder 114 disposed between the turntable 106 and the lower boom section 108 and an upper boom cylinder 116 disposed between the lower boom section 108 and the upper boom section 110, as shown. In some embodiments, the cylinders 114 and 116 may be actuated hydraulically using a hydraulics system of the boom assembly 104. However, embodiments are contemplated in which other suitable actuation techniques may be employed to actuate the cylinders 114 and 116 such as, for example, electrical actuation, pneumatic actuation, and magnetic actuation. Further, in some embodiments, a combination of different actuation techniques may be used. Embodiments are contemplated in which the boom assembly 104 comprises one or more rotary actuators. For example, in some embodiments, the boom assembly 104 comprises a slew drive for controlling rotation of a respective joint of the boom assembly 104.

In some embodiments, the lower boom cylinder 114 may control the angle of rotation of the lower boom section 108 relative to the turntable 106. Similarly, the upper boom cylinder 116 may control the angle of rotation of the upper boom section 110 relative to the lower boom section 108. Additionally, in some embodiments, a pivotable connection may be included between the distal end of the upper boom section 110 and the remote assembly system 300 for controlling the angle of the base of the remote assembly system 300. In some such embodiments, the pivotable connection may be configured to automatically maintain an upright orientation of the remote assembly system 300. For example, the pivotable connection may include one or more gyroscopes and/or interface with a control system for maintaining the upright orientation of utility platform such that the utility platform is held in an upright position regardless of the orientation of the rest of the boom assembly 104. Additionally, or in the alternative, embodiments are contemplated in which the orientation of the base of the remote assembly system 300 may be controlled manually by an operator using one or more input devices.

Figure 2:
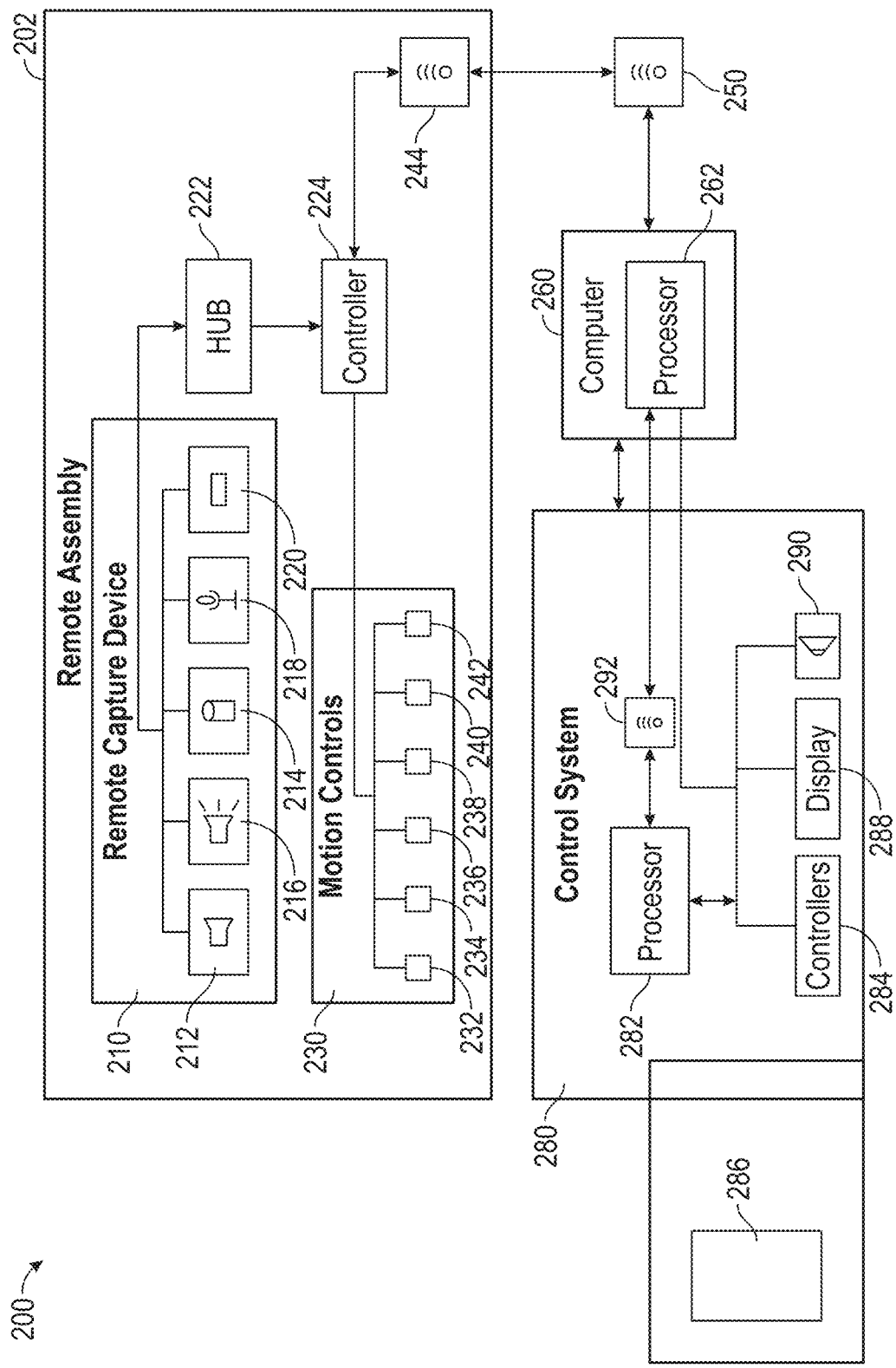
FIG. 2 depicts an exemplary system architecture of a robot unit and manual controls relating to some embodiments.

FIG. 2 depicts an exemplary block diagram 200 related to embodiments of the present disclosure. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 104 for interacting with a work site to perform one or more task. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote robot assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial application. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 4K, or 8K resolution. However, it will be appreciated that the camera 212 may be any currently known or yet to be discovered camera for capturing video. Video captured from camera 212 may be stored locally at remote capture device at a local memory 214. Local memory 214 may be any of the storage or memory described below with respect to FIG. 9. The storing of video at local memory 214 may aid in providing a failsafe or backup storage of captured video in the event of a transmission or upload failure. Further, the storing of video at local memory 214 may aid in situations of poor wireless connection or if a direct line becomes loos or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 104 for telecommunication or power line work. In such a work application, the remote assembly 202 may be working on or near live power line or other conductive lines transferring electricity. Accordingly, in some embodiments, remote capture device 210 may comprise at least one sensor 220 configured as an electricity sensor for determining whether a cable or power line has electricity running through it. However, it will be appreciated that remote capture device 210 may comprise additional sensors 220 configured and adapted for providing remote capture device and/or remote assembly 202 with additional information. By way of non-limiting example, sensor 220 may comprise any of the following sensors: a gyroscope, an accelerometer, a thermometer, a barometer, a light emitter, among other sensors that may be utilized in the intended application of remote assembly 202.

In some embodiments, the remote assembly 202 may further comprise at least one digital Hub 222. In some embodiments, the remote assembly 202 further comprises at least one digital Hub 222. The digital Hub 222 may receive the captured sensory information from remote capture device and convert the captured sensory information into a format suitable for transmitting to computer 260 and/or control system 280. In some embodiments, the digital Hub 222 is a USB Hub, such as, for example, a USB 3.0.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as WiFi, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, oftentimes telecommunications repair or power line repair sometimes occur during or immediately after a severe weather storm. This type of scenario can be wrought with dangers such as exposed and live power lines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. Exemplary embodiments of controller 284 are provided below with respect to FIG. 4, however, it will be appreciated that the depicted embodiments are intended to be illustrative, rather than limiting. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, may It will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIG. 9 below. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator was physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly system 300. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Figure 3:
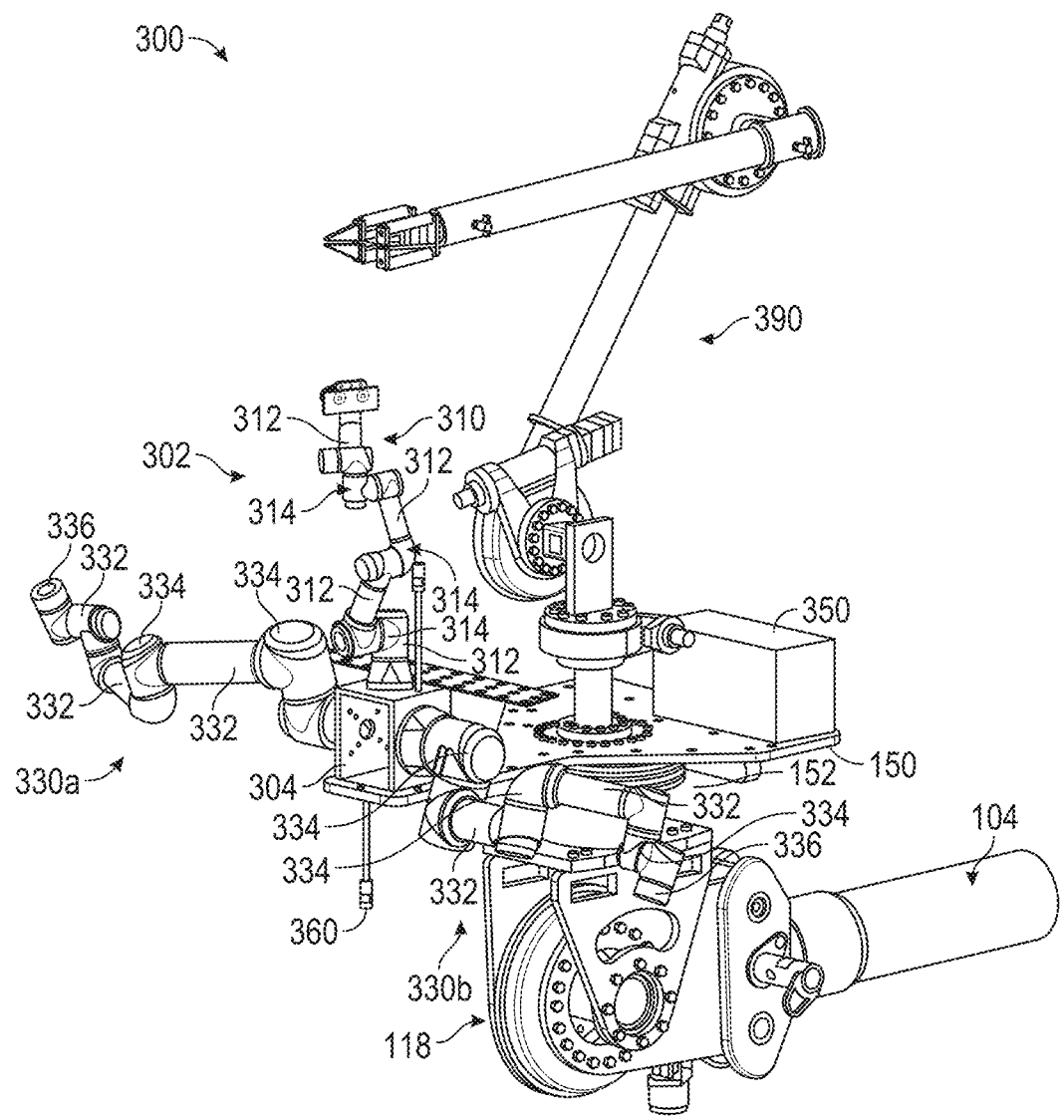
FIG. 3 depicts a six-degree-of-freedom robot unit relating to some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 104. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be fully a fully automated robot, wherein the robot unit 302 performs actions or movements based on pre-programmed instructions for automation. In even further embodiments, robot unit 302 may be a robot configured to respond to both manually inputted instructions and automated programming. Accordingly, the various movements or actions performed by robot unit 302 and described herein may be performed based on manually provided instructions and/or automated programming.

As described above and as illustrated in FIG. 3, in some embodiments, remote assembly system 300 may be positioned at the distal end of boom assembly 104. As depicted, in some embodiments, distal end of boom assembly 104 may comprise a pivot joint comprising a motor. In some embodiments, pivot joint may be used to change an angle or position of remote assembly system 300. In further embodiments, pivot joint may be paired with a sensor, such as a gyroscope, to aid in maintaining a leveled position of remote assembly system 300. As further depicted in FIG. 3, pivot joint may further act as an attachment point between remote assembly system 300 and boom assembly 104. For example, a base may be coupled to pivot joint. Base may be adapted and configured for receiving and coupling remote assembly system 300. Accordingly, through such coupling, remote assembly system 300 may be secured and attached to boom assembly 104. In some embodiments, base may comprise a generally planar design for accepting and securing one or more assemblies, sub-assemblies, parts, or components of remote assembly system 300. Further, the size and shape of base may vary, and may be dependent on design of remote assembly system 300. Further, in some embodiments, base may further comprise a motorized turntable 106. Motorized turntable 106 may be a power motor train system for rotating base. The rotation of base may be advantageous for positioning remote assembly system 300 during use.

In some embodiments, remote assembly system 300 may generally comprise a robot unit 302. Robot unit 302 may be a controllable robotics unit that can perform a range of movements and actions, such as performing repair work in a telecommunication setting. In some embodiments, and as described in greater detail below, robot unit 302 may be 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be relayed to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device. In some embodiments, the sensory capture device generally comprises at least one camera, three-dimensional camera, and/or sensor for capturing sensory information.

As described above, robot unit 302 may be adapted for performing repair work, maintenance work, or other similarly situation tasks or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separate by motorized pivotable joints 334. The number and size of utility mount segments 332 and pivotable joints 334 may vary on the embodiments and application of robot unit. Generally, in response to an instruction or commands, one or more of the pivotable joints 334 may activate to rotate or move utility arms 330*a*, 330*b*. In some embodiments, the pivotable joints 334 may be used to move utility arms 330*a*, 330*b* in the X-axis, Y-axis, Z-axis as well as control the roll, pitch, and yaw of the camera mount 310. Accordingly, through movement in the 6 DOF, each utility arm 330*a*, 330*b* may mimic or replicate the movement of an operator's arms and hands. In some embodiments, the distal ends 336 of utility arms 330*a*, 330*b* may comprise one or more tools, flanges, or other apparatus for performing an action such as repair work. In some embodiments, distal ends 336 may comprise an adapter or may be otherwise configured for accepting a tool.

Remote assembly system 300 may further comprise a remote power source 350. In some embodiments, the remote power source 350 may be secured to the base. In further embodiments, remote power source 350 may be located within central hub 304. The remote power source 350 may be used to power camera mount 310, utility arm 330*a*, utility arm 330*b*, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator in addition to the sensors 410 as described below. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. accordingly, to avoid damage to the robot unit 302, the boom assembly 104, or the utility vehicle 102, at least one sensor 360 may be a sensor for detecting an electrical current. Additionally, robot unit 302 may comprise at least one sensor 360 that is at least one of an accelerometer, gyroscope, light sensor, or other sensor for detecting the positioning of camera mount 310, utility arm 330*a*, and/or utility arm 330*b*. As described in greater detail below, a sensor for detecting the positioning of robot unit 302 may aid in replicating or mimicking movement of an operator using motion controls.

In some embodiments, and as depicted in FIG. 3, in addition to robot unit 302, boom assembly and remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotics configured for transporting heavy loads. However, once in position, the part may need a robotics configured for delicate or sophisticated operations to install the part in position. Embodiments of the present disclosure solve this dilemma by pairing a robotics configured and adapted for fine tuning and/or delicate work with a robotics configured and adapted for load bearing or transporting heavy loads. For example, in some embodiments, robot unit 302 may be configured and adapted for performing movements or actions directed to sophisticated, delicate, or fine-tuning work, such as unthreading wire, cutting wire, loosening screws and bolts. In some embodiments, 300 may comprise a at least one utility arm 390 for holding or transporting heavy loads that may be too heavy for robot unit 302 to safely hold and transport. Accordingly, through the combination of robot unit 302 and utility arm 390, remote assembly system 300 may perform both dexterous actions and load-bearing actions.

Figure 4:
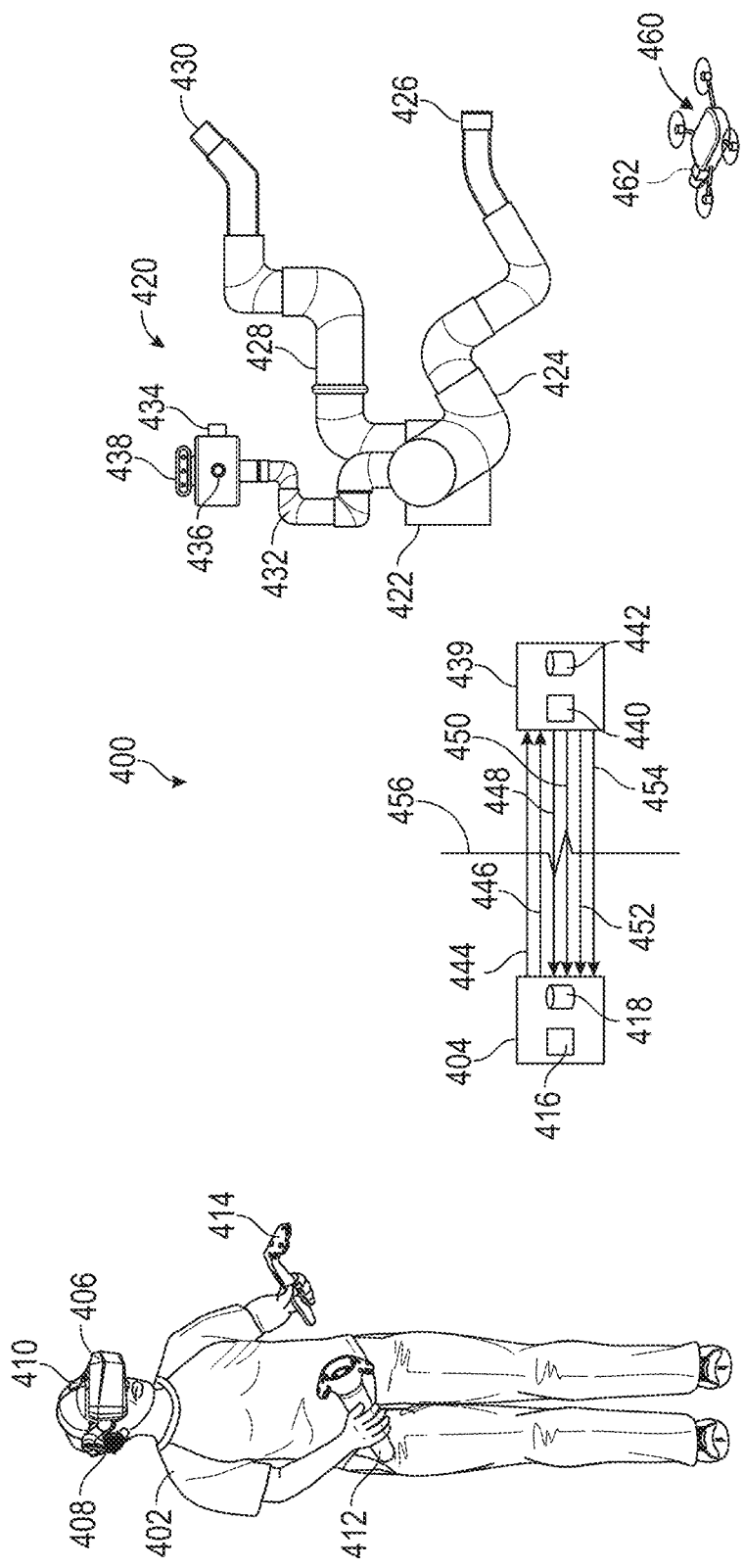
FIG. 4 depicts an exemplary remote operation system relating to some embodiments.

FIG. 4 depicts an exemplary remote operation system 400 relating to some embodiments. In some such embodiments, an operator 402 may be equipped with at least one user device 404. In some embodiments, the user device 404 comprises a computer or other computing device. The user device 404 may comprise or be associated with a head-mounted display such as a virtual reality headset or the like. In some embodiments, the user device 404 includes or interfaces with at least one display 406 and one or more speakers 408, as shown. For example, the display 406 may be disposed on a front of the headset and the speakers 408 may be positioned on either side of the headset such that stereophonic audio may be provided. Additionally, in some embodiments, the user device 404 may include at least one sensor 410 disposed on or in the user device 404. For example, in some embodiments, the at least one sensor 410 may include any combination of accelerometers, gyroscopes, or angular position sensors for measuring an angle or change in angular position of the user device 404.

In some embodiments, the user device 404 may further include one or more controllers such as a first position sensitive controller 412 and a second position sensitive controller 414, as shown. In some embodiments, each of the first position sensitive controller 412 and the second position sensitive controller 414 may be configured to be held in the hands of the operator 402 for reading the position of the hands of the operator 402. In some such embodiments, the first position sensitive controller 412 and the second position sensitive controller 414 may incorporate one or more position sensitive sensors, such as any of accelerometers, gyroscopes, potentiometers, load cells, as well as other sensors suitable to measure the position and angular position of the hands of the operator 402. In some embodiments, the user device 404 comprises any number of joysticks such as any combination of single-axis or multi-axis joysticks. For example, one or more 3-axis joysticks or 6-axis joysticks may be used to control motion of either of the robotic assembly 420 or the boom assembly 104. In some embodiments, a 6-axis joystick may be used to control motion in six degrees of freedom. For example, in some embodiments, the position sensitive controllers 412 and 414 may include a 6-axis joystick or other multi-axis control means.

In some embodiments, the user device 404 interfaces with or includes at least one processor 416 and at least one data storage 418. For example, in some embodiments, the processor 416 and data storage 418 may be internally or externally included on the user device 404. Additionally, embodiments are contemplated in which the processor 416 and data storage 418 may be included externally on another device that interfaces with the user device 404. For example, an external computer may interface with the user device 404 via either of a wired or wireless connection.

In some embodiments, the remote operation system 400 includes a robotic assembly 420, as shown, that may interface with the user device 404. In some embodiments, the robotic assembly 420 comprises a base 422, as shown. In some embodiments, the robotic assembly 420 may be disposed at the distal end of the upper boom section 110 in place of or in addition to the utility platform. For example, in some embodiments, the base 422 of the robotic assembly 420 may be pivotably secured to a boom tip of the boom assembly 104. The robotic assembly 420 may include one or more robotic arms. For example, in some embodiments, the robotic assembly 420 comprises a first robotic arm 424 including a first robotic arm end 426 and a second robotic arm 428 including a second robotic arm end 430, as shown. Embodiments are contemplated in which the robotic arms 424 and 428 include any number of sensors for measuring the position and angle of one or more joints within each robotic arm. Accordingly, information may be monitored related to the position and orientation of the robotic arms in 3-dimensional space.

Additionally, in some embodiments, the robotic assembly 420 comprises a camera robotic arm 432 including one or more cameras 434 and one or more microphones 436 disposed at an end of the camera robotic arm 432. In some embodiments, two or more cameras 434 may be included to provide stereoscopic vision, which may improve visual depth. Similarly, two or more microphones 436 may be included to provide stereophonic audio. In some embodiments, the cameras 434 and the microphones 436 may be configured to continuously capture video data and audio data respectively. Further, in some embodiments, the camera robotic arm 432 is configured to rotate and/or pivot about one or more joints to adjust the positioning and angle of the cameras 434 and the microphones 436.

In some embodiments, the robotic assembly 420 includes a depth sensor 438 disposed, for example, at the end of the camera robotic arm 432, as shown. The depth sensor 438 may be configured to collect 3-dimensional range information in proximity to the robotic assembly 420. In some such embodiments, the depth sensor 438 is operable to collect a 3-dimensional scan of a work area associated with the robotic assembly 420. Additionally, in some embodiments, the depth sensor 438 collects information relating to the positioning of the robotic arms. Further, in some embodiments, the depth sensor 438 may be used for object identification, for example, to prevent unintentional collisions of the robotic assembly 420 with foreign objects. In some embodiments, the depth sensor 438 may be a lidar sensor or other type of depth sensor. Further still, embodiments are contemplated in which a plurality of depth sensors 438 may be included. For example, an array of lidar sensors may be disposed around the robotic assembly 420 to capture a 3-dimensional scan of the work area. Additionally, in some embodiments, both of a front facing lidar sensor and a rear facing lidar sensor may be included to generate a 3-dimensional scan of the areas ahead of and behind the robotic assembly 420 respectively.

In some embodiments, the robotic assembly 420 interfaces with or includes a computing device 439 such as a computer or controller. The computing device 439 may include at least one processor 440 and at least one data storage 442, as shown. For example, in some embodiments, the computing device 439 may be included internally or externally on the robotic assembly 420. Additionally, embodiments are contemplated in which the computing device 439 may be included as an external computing device interfaced with the robotic assembly 420. Such an external computing device may be disposed, for example, in the vicinity of the robotic assembly 420 or elsewhere such as near the user device 404. Accordingly, embodiments are contemplated in which signal processing takes place at the robotic assembly 420, at the user device 404, or any combination thereof.

In some embodiments, a bidirectional communication connection may be established between the user device 404 and the robotic assembly 420. In some embodiments, the robotic assembly 420 and the user device 404 may be communicatively coupled via any of a non-electric wired connection such as a fiber optic cable, or a wireless connection such as a wireless network connection or Bluetooth connection. Embodiments are contemplated in which an electrical wired connection may be used such as a traditional electrical cable, however, it may be unsafe to use an electrical communication connection while the aerial device is electrically bonded to an energized power line. As such, in some embodiments, in which electrical bonding is used, alternative communication connections are used. In some embodiments, a plurality of data signals may be transmitted from the user device 404 to the robotic assembly 420 and vice versa. For example, in some embodiments, a controller signal 444 including information indicative of the position and orientation of the first position sensitive controller 412 and/or the second position sensitive controller 414 may be transmitted from the user device 404 to the robotic assembly 420. Similarly, a sensor signal 446 including information indicative of the position and orientation of the at least one sensor 410 may be transmitted from the user device 404 to the robotic assembly 420.

Additionally, in some embodiments, data signals may be transmitted from the robotic assembly 420 to the user device 404. For example, a video data 448 including images captured by the cameras 434 may be transmitted from the robotic assembly 420 to the user device 404. Similarly, audio data 450 including audio captured by the microphones 436 may be transmitted from the robotic assembly 420 to the user device 404. Further, in some embodiments, scan data 452 including information indicative of the 3-dimensional data and/or distance data captured by the depth sensor 438 may be transmitted from the robotic assembly 420 to the user device 404. In some embodiments, computer-vision techniques may be applied to the image data and/or the depth data, for example, to identify one or more objects within the work area of the remotely operated equipment.

In some embodiments, a feedback signal 454 may be transmitted from the robotic assembly 420 to the user device 404. In some such embodiments, the feedback signal 454 may include haptic feedback or some other notification from the robotic assembly 420. For example, in some embodiments, the feedback signal 454 may include instructions to cause either of the first position sensitive controller 412 or the second position sensitive controller 414 to vibrate or generate force feedback for the operator 402 responsive to a collision or a potential collision condition. Further still, embodiments are contemplated in which the feedback signal 454 causes any of vibration or force feedback within the first position sensitive controller 412 and/or second position sensitive controller 414, audible feedback within the one or more speakers 408 such as a ringing alarm, visual feedback within the least one display 406 such as a flashing light, or any combination thereof. In some embodiments, the feedback signal 454 may be transmitted based on one or more triggers. For example, a trigger may be generated when the robotic assembly 420 is approaching a collision or a singularity. In some embodiments, any of the data signals described above may be submitted in real-time. For example, the video data 448 and the audio data 450 may be continuously provided from the robotic assembly 420 such that the image data captured by the cameras 434 is displayed on the displays 406 in real-time with minimal latency.

In some embodiments, one or more of the signals described herein may be transmitted across a dielectric gap 456. In some embodiments, the user device 404 may be disposed at a remote location with a different voltage potential from that of the robotic assembly 420. For example, the robotic assembly 420 may be electrically bonded to an energized power line for performing work on or in the vicinity of the energized power line. Accordingly, the robotic assembly 420 is held at a similar electrical potential as the energized power line and is insulated from coming into contact with ground potential. Accordingly, in some embodiments, traditional electrical communication techniques may be avoided to prevent electric shock. As such, embodiments are contemplated in which a fiber optic cable or wireless connection are used for communication with the robotic assembly 420 to prevent electrical signals at ground potential from reaching the robotic assembly 420.

In some embodiments, at least one drone 460 may be included. For example, drones or other autonomous vehicles may be positioned around the work area of the robotic assembly 420. In some such embodiments, the drone 460 may include at least one sensor 462 such as a camera or lidar sensor for capturing additional information about the work area. In some embodiments, the at least one sensor 462 comprises any combination of one or more cameras and one or more lidar sensors. For example, in some embodiments, a drone 460 may hover around a back side of a utility pole to capture additional image data that is not otherwise visible to the robotic assembly. Additionally, in some embodiments, the drone 460 may include a lidar sensor for capturing 3-dimensional data of the work area. In some embodiments, the drone 460 may communicate with any of the robotic assembly 420 or the user device 404 via wired or wireless communication. In some embodiments, image data captured by the drone 460 may be transmitted to the user device 404.

In some embodiments, the robotic arms 424 and 428 may be configured to move based on the motion of the position sensitive controllers 412 and 414. For example, in some embodiments, the end of each robotic arm is positioned relative to the position of the position sensitive controllers such that the first robotic arm end 426 is positioned based on the position of the first position sensitive controller 412 and the second robotic arm end 430 is positioned based on the position of the second position sensitive controller 414. Accordingly, if the operator 402 moves the first position sensitive controller 412 upwards the first robotic arm 424 will automatically be adjusted such that the first robotic arm end 426 is also moved upwards. In some embodiments, the robotic arms may be adjusted by pivoting about one or more joints disposed within the robotic arms. Similarly, in some embodiments, the camera robotic arm 432 may be moved such that the camera 434 disposed at the end of the camera robotic arm 432 is positioned based on the position of the headset of the user device 404. For example, as the operator 402 moves and tilts their head, the camera robotic arm 432 will be moved and tilted such that the position of the cameras 434 matches the position of the operator's eyes.

In some embodiments, the position of the robotic assembly 420 may be shifted relative to the position of the operator 402. For example, in some embodiments, the operator 402 may temporarily freeze motion of the robotic assembly 420 to reset a home position of the robotic assembly 420. Accordingly, the operator 402 may pause the robotic assembly 420 preventing unintended motion and locking the robotic assembly 420 in place, move their arms into a more comfortable position, and then resume operation, for example, by submitting a subsequent resume input, and continue to control motion of the robotic assembly 420 from a more comfortable position. Here, the operator 402 may position their arms comfortably at a low position while the robotic arms 424 and 428 are raised upwards rather than having to hold their arms at an uncomfortably raised position for an extended period of time. Further, embodiments are contemplated in which the operator 402 controls motion of the robotic assembly 420 from a sitting position in a remote location, such as in an office chair, in a vehicle seat, or in another location remote from the robotic assembly 420. In some embodiments, requests to pause and resume motion of the robotic assembly may be received as operator inputs, for example, via the user device 404 such as through one or more buttons on the controllers 412 and/or 414.

Embodiments are discussed above in which the operator actively selects an input to pause and resume the motion control. However, it should be understood that further embodiments are contemplated in which an input such as the operator 402 pressing a button on the position sensitive controllers 412 and 414 may be used to initiate movement of the robotic assembly 420. Accordingly, in some such embodiments, the robotic assembly 420 will only move while the button is held on the respective controller. Accordingly, the operator 402 can shift the position of the motion controls by letting go of said button and moving the controllers into the desired position.

It should be understood that, in some embodiments, a variety of processing options are contemplated. For example, in some embodiments, a first processing stage may occur at or on the robotic assembly 420 such as by the processor 440 and a second processing stage may occur at the user device 404 such as by the processor 416. Here, various processing techniques may be applied to the collected signals. For example, data filtering and smoothing algorithms may be employed by the processor 440 of the robotic assembly 420 to smooth the data signals transmitted to the user device 404. Further, in some embodiments, portions of the data collected by the robotic assembly 420 may be stored within the data storage 442. Additionally, or alternatively, data processing and storage may occur at the user device 404. For example, raw data received from the robotic assembly 420 may be filtered and transformed using the processor 416 of the user device 404.

In some embodiments, the robotic assembly 420 may be disposed on the boom assembly 104. For example, the robotic assembly 420 may be included at the distal end of the boom at a boom tip of the boom assembly 104. In some embodiments, the robotic assembly 420 may be included in place of or in addition to the utility platform. Additionally, embodiments are contemplated in which the robotic assembly 420 may be attached to other devices such as directly onto the utility vehicle 102 or onto another suitable device not explicitly described herein. Further, in some embodiments, the robotic assembly 420 may be included as a stand-alone device.

Embodiments are contemplated in which at least a portion of the remote operation system 400 described above may be employed for controlling the motion of the boom assembly 104 of FIG. 1. For example, the joints of the boom assembly 104 may be rotated and adjusted to match the boom tip with a specified position of velocity requested by the operator 402. For example, the operator 402 may control the motion of the boom assembly 104 using the first position sensitive controller 412 such that position changes of the first position sensitive controller 412 are repeated by the boom tip. It should be understood that the position changes may not be to scale and a scaling factor may be used to translate controller movements to boom tip movements. For example, a movement of about 3 inches of the first position sensitive controller 412 may be converted to a movement of about 18 inches of the boom tip with a scaling factor of 6.0. However, it should be understood that other scaling factors may be used and, in some embodiments, an operator may select and adjust the scaling factor during operation. Further still, in some embodiments, the scaling factor may be set automatically based on a type of operation being performed by the boom assembly 104 and/or the robotic assembly 420.

Embodiments are contemplated in which both the robotic assembly 420 and the boom assembly 104 may be remotely controlled by one or more operators. Here, the robotic assembly 420 and the boom assembly 104 may be controlled simultaneously using separate input devices or using separate portions of the same input device. Additionally, in some embodiments, the operator may be able to switch modes of a single input device to selectable switch between control of the robotic assembly 420 and the boom assembly 104. For example, an operator may select between a robot control mode, a boom control mode, or other suitable operational control modes. For example, in some embodiments, a plurality of robotic assemblies may be included such that the operator 402 may switch between modes for controlling each respective robotic assembly.

Figure 5:
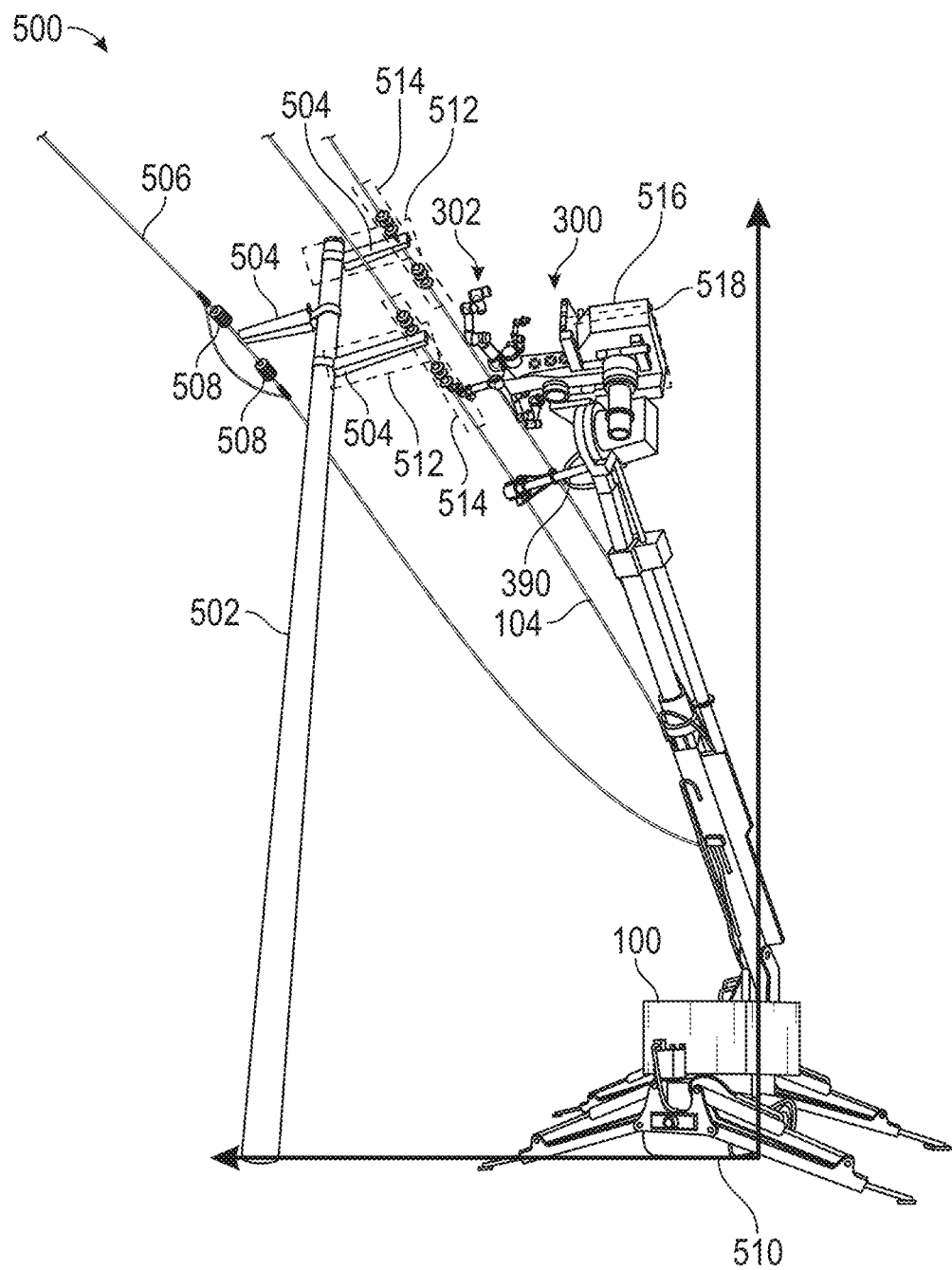
FIG. 5 illustrates an exemplary operational diagram of the aerial device relating to some embodiments of the present disclosure.

FIG. 5 illustrates an exemplary operational diagram 500 of the aerial device 100 relating to some embodiments of the present disclosure. The aerial device 100 may be positioned in proximity to a utility structure 502, such as a utility pole, a utility tower, or another suitable structure operable to support one or more power or communication cables. The utility structure 502 may include one or more crossarms 504 disposed thereon. A power line 506 may be coupled to the one or more crossarms 504, as shown, for example, at an end of the crossarm 504. Further, one or more insulators 508 may be included. The insulators 508 may be disposed at each respective coupling of the power line 506 to the crossarms 504. In some embodiments, a plurality of crossarms 504 is included, for example, three crossarms or crossarms with three respective coupling points may be included to distribute three-phase power.

In some embodiments, an origin 510 of the control system of the remote assembly system 300 may be positioned at a base of the aerial device 100. For example, in some embodiments, the aerial device 100 is not integrated into a utility truck and may exist as a standalone system, as shown. The aerial device 100 may include a crane or other standalone system with a plurality of outriggers to stabilize and support the aerial device 100 as the boom assembly 104 is articulated or extended. The origin 510 may be used as a reference point for the control system to a respective position of any of the aerial device 100, the boom assembly 104, the remote assembly system 300, as well as other portions of the aerial device 100 and system, and the utility structure 502 and associated components, such as the one or more crossarms 504, the power line 506, and one or more insulators 508.

In some embodiments, a base of the utility structure 502, i.e., a bottom of the utility structure 502, where the utility structure 502 contacts the ground, may be identified as an anchor point within the control system. For example, the control system may assume that the base of the utility structure 502 is fixed and does not move with respect to the ground. Therefore, the base of the utility structure 502 may also be used as a reference point when determining the position of other associated components. Further, embodiments are contemplated in which the base of the utility structure 502 is used as the origin for the control system.

In some embodiments, one or more virtual barriers may be established within the control system. For example, a crossarm virtual barrier 512 may be included for each respective crossarm 504 and a power line virtual barrier 514 may be included for each respective power line 506. In some embodiments, virtual barriers may be included for insulators 508 and other components of the utility structure 502, or other objects within the operational environment, as well as for the equipment of the remote assembly system 300.

In some embodiments, the virtual barriers, such as the crossarm virtual barrier 512, the power line virtual barrier 514, or other virtual barriers described herein, comprise a capsule shape or "pill" shape. The capsule shape may be defined based on two distinct points and a radius. Accordingly, the capsule shape virtual barrier may comprise a central cylindrical shape with a predetermined radius and endpoints at each of the distinct points. The capsule shape virtual barrier further includes rounded half-sphere shapes at each end with the predetermined radius. In some embodiments, the radius may be determined, for example, based on the type of object with which the virtual barrier is associated. For example, the radius of a virtual barrier may be larger for a high-voltage power line than another object or a lower voltage line. In some such embodiments, the radius may be determined based at least in part on an arc length associated with a voltage level of the power line 506. For example, the radius may be determined based on approximately 0.5 inches per 1,000 volts of electrical potential. Alternatively, or additionally, in some embodiments, a more conservative radius may be used for extremely high voltages. For example, a radius of 7 feet, 8 feet, or 10 feet may be used for a 500,000-volt line.

In some embodiments, other shapes are contemplated for the virtual barriers, as referred to herein. For example, in some embodiments, at least one virtual barrier may comprise any of a cube shape, a rectangular prism shape, a 2-dimensional plane, a 2-dimensional rectangle, as well as other 2-dimensional and 3-dimensional shapes not explicitly described herein. However, in some embodiments, a plurality of capsule shaped virtual barriers is used to provide the virtual barriers. The capsule shape may be considered more efficient and simpler to define as being defined by two points and a radius.

In some embodiments, the remote assembly system 300 further includes a receptacle 516. For example, the receptacle 516 may be disposed on a backside of the remote assembly system 300 and be configured to hold one or more tools or other objects relating to the remote operation. Further, the receptacle 516 may be used to store objects such as additional insulators, conductors, and other power line equipment. In some embodiments, a receptacle virtual barrier 518 may be included for the receptacle 516 to provide a spatial representation of the receptacle 516 within the control system of the remote assembly system 300.

Figure 6A:
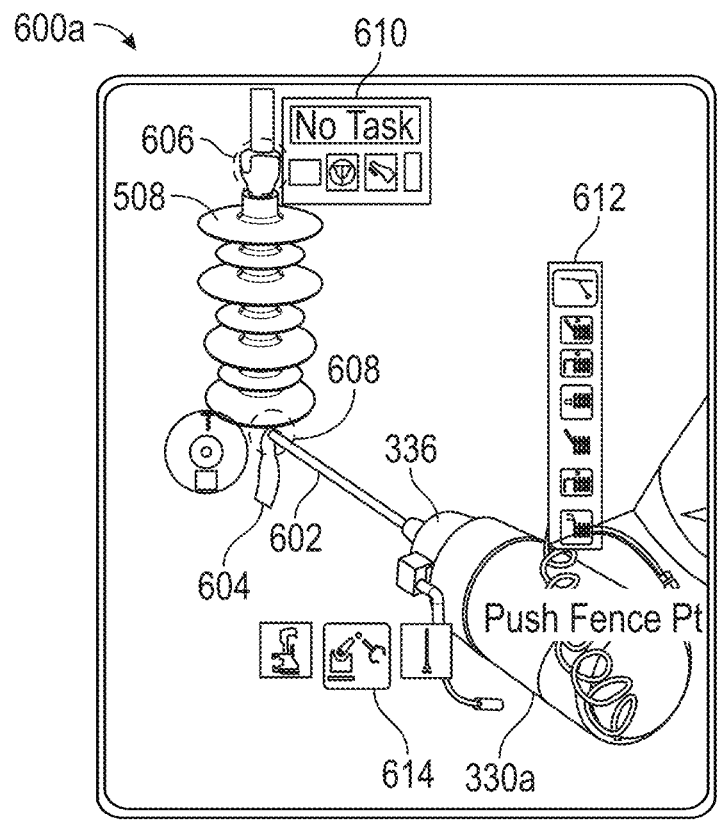
FIG. 6A illustrates an exemplary operator interface showing a view of the remote operating environment, as displayed, for example, using a display device such as the at least one display, to an operator.
Figure 6B:
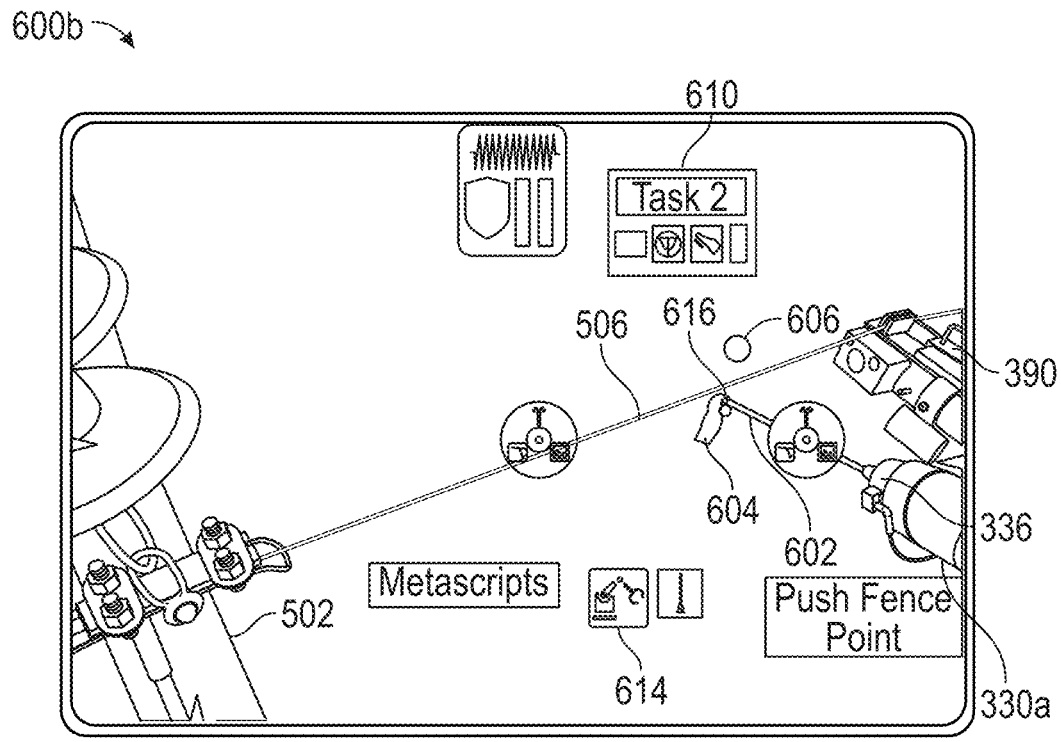
FIG. 6B illustrates exemplary operator interface showing a view of the remote operating environment, as displayed, for example, using a display device such as the at least one display, to an operator.

FIGS. 6A and 6B illustrate depictions of an exemplary operator interface for placing virtual barriers relating to some embodiments of the present disclosure. In some embodiments, the operator interface may include a depiction of the remote operating environment generated for an operator. For example, the operator interface may include a virtual reality interface or augment reality interface of the remote operating environment to simulate real-time sensory information of the remote operating environment. In some embodiments, the sensory information of the operator interface includes any combination of a real-time visual information such as imagery of the remote operating environment captured using an image sensor, such as one or more cameras, and real-time audio associated with the remote operating environment captured using an audio sensor, such as one or more microphones. The operator interfaces, as described herein, may be generated for display on any suitable display such as, for example, a computer monitor, laptop display, mobile, display, head-mounted display, or the like. In some embodiments, the operator interfaces are displayed in real-time while the remote assembly system 300 is in use.

FIG. 6A illustrates an exemplary operator interface 600*a* showing a view of the remote operating environment, as displayed, for example, using a display device such as the at least one display 406, to an operator. In some embodiments, the remote assembly system 300 may be used to establish one or more virtual barriers. For example, the utility arm 330*a* may use a picker tool 602 to select one or more points or endpoints to define a virtual barrier. In some embodiments, the picker tool 602 may include a non-conductive elongated rod coupled to the utility arm 330*a* at a proximal end. For example, the picker tool 602 may be coupled at the distal end 336 of the utility arm 330*a*. In some embodiments, the picker tool 602 includes a flag 604 disposed at a distal end of the picker tool 602. Alternatively, in some embodiments, another form of visual indicator may be disposed at the end of the picker tool 602, such as, any of a ball, a reflective object, or another visually distinct object to indicate a location of the distal end of the picker tool 602.

The picker tool 602 may be used to place one or more points of interest for defining a virtual barrier. For example, to place a virtual barrier around an insulator 508, the picker tool 602 may be used to place a first point 606 at a first end of the insulator 508 and a second point 608 at a second end of the insulator 508, as shown. The points 606 and 608 may be placed based on the location of the flag 604 or distal end of the picker tool 602. For example, an operator may request movement of the utility arm 330*a* to position the flag 604 into a desired position, then provide a subsequent input to place the point, such as using a button or other input on the first position sensitive controller 412 or second position sensitive controller 414. However, it should be understood that other suitable forms of input are also contemplated. For example, an input to place points 606 and 608 may be received from a mouse, keyboard, controller, or other suitable input device.

After placement of the points 606 and 608, a visual representation may be generated within the exemplary operator interface 600*a* to display the selected points to the operator. In some embodiments, the points 606 and 608 may be displayed within the operator interface 600*a* as overlay elements, such that the points 606 and 608 appear over a real-time image of the remote operating environment.

In some embodiments, other overlay elements may be included within the operator interface 600*a*, for example, using augmented reality techniques to overlay additional information onto a real-time image. Embodiments are contemplated in which the overlay includes a current task indicator 610. The current task indicator 610 may indicate a current task being performed with the remote assembly system 300. In some embodiments, the overlay further includes one or more interface instructions 612. The interface instructions 612 may include an ordered list of actions to be performed with the remote assembly system 300. For example, the one or more interface instructions 612 may include any of an instruction to place one or more points and an instruction to confirm a virtual barrier position.

In some embodiments, one or more instructions may be displayed within the operator interface 600*a*. For example, an instruction to push a fence point may be included instructing the operator to place one or more points, such as points 606 and 608, to define a virtual barrier for an object. In some embodiments, additional instructions are operable to be displayed within the operator interface 600*a*. The instructions may be triggered to be displayed responsive to a progress of a sequence of operations for the remotely operated equipment. For example, if a virtual barrier has not yet been placed or fully defined, an instruction to place a fence point may be displayed. Similarly, if a virtual barrier has already been placed and defined, an instruction to modify the barrier positioning or place a new barrier may be displayed.

In some embodiments, an active indicator 614 is included within an overlay of the operator interface 600*a*. The active indicator 614 may indicate a portion of the remote assembly system 300 that is currently active. For example, if the utility arm 330 is currently being actively controlled, the active indicator 614 may include a utility arm icon, as shown. Alternatively, or additionally, if the heavy utility arm 390 or the picker tool 602 are currently being used, a heavy utility arm icon and picker tool icon may be displayed in the operator interface 600*a*.

In some embodiments, the operator interface 600*a* includes any of a plurality of additional interface elements. For example, operator interface 600*a* may include a show virtual barriers view or show fence view interface element operable to selectively display one or more virtual barriers within the operator interface 600*a*. In some such embodiments, the show virtual barriers view interface element comprises a button operable to toggle whether the one or more virtual barriers are displayed or suppressed from the operator interface.

FIG. 6B illustrates exemplary operator interface 600*b* showing a view of the remote operating environment, as displayed, for example, using a display device such as the at least one display 406, to an operator. In some embodiments, the picker tool 602 may be used to establish a virtual barrier around a power line 506. In some embodiments, a virtual barrier for the power line 506 may be positioned based on a single point 606. For example, in some embodiments, horizontal virtual barriers are used for power lines and other horizontally elongated objects such as neutral lines, communication cables, and other cables. Here, a single selected point and a position of the robotic equipment may be used to determine a continuous horizontal line. For example, the heavy utility arm 390 may be coupled to the power line to hold the power line in place and/or maintain tension in the power line. Accordingly, the position of contact between the power line 506 and the heavy utility arm 390 may be used, in addition to the selected point, to define a horizontal line for the virtual barrier.

In some embodiments, the picker tool 602 is used to define a portion of the spatial coordinates for the virtual barrier point 606. For example, in some embodiments, the X and Y coordinates of the virtual barrier point 606 are defined by an end of the picker tool 602 while a Z coordinate of the virtual barrier point 606 is defined by a position of the heavy utility arm 390. Here, the Z coordinate of the point 606 may be locked to a Z coordinate of an end of the heavy utility arm 390 or point of contact of the heavy utility arm 390 with the power line 506. Additionally, in some embodiments, the virtual barrier points may be defined based at least in part on the positions of other objects within the remote operating environment. For example, a virtual barrier point may be defined based at least in part on any of the utility structure 502, the utility arm 330, the distal ends 336, the heavy utility arm 390, the boom assembly 104, or other portions of the remote assembly system 300 or objects in the remote operating environment.

In some embodiments, other additional operator interface elements and overlay elements may be included such as those described above, or other elements not explicitly described herein. For example, the 600b may include the current task indicator 610, the one or more interface instructions 612, the active indicator 614, or other overlayed operator instructions.

Figure 7:
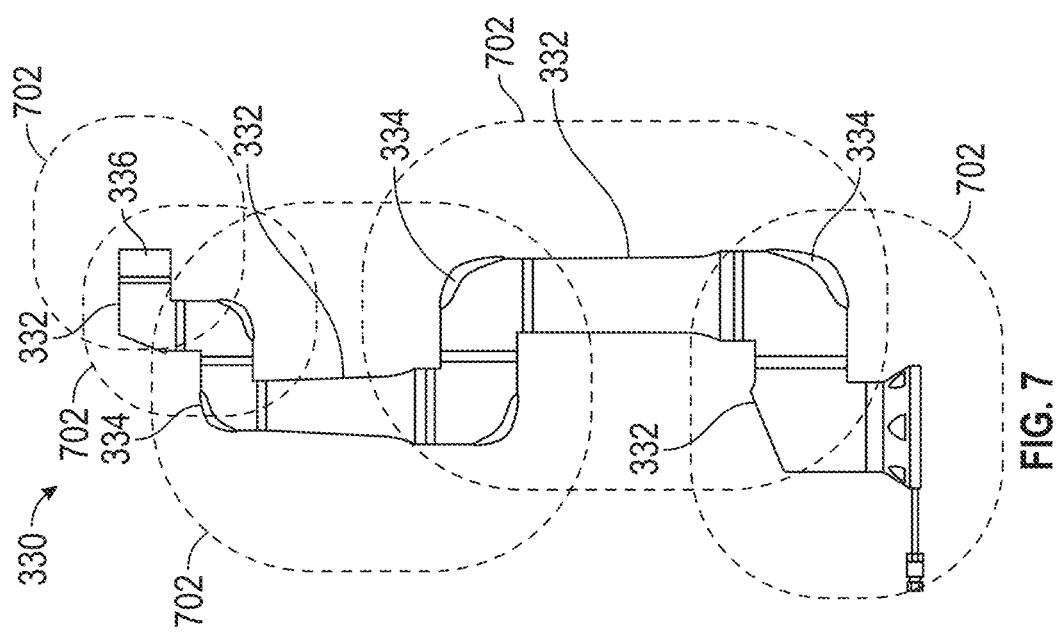
FIG. 7 illustrates an exemplary placement of virtual barriers for a utility arm of the robot unit relating to some embodiments of the present disclosure.

FIG. 7 illustrates an exemplary placement of virtual barriers for a utility arm of the robot unit relating to some embodiments of the present disclosure. For example, an equipment virtual barrier 702 may be included for each respective arm linkage of the utility arm 330, as shown. In some embodiments, each arm linkage comprises a respective arm segment 332 and pivotable joint 334. It should be understood that the utility arm 330 may correspond to either of the utility arms 330a or 330b.

In some embodiments, each of the plurality of equipment virtual barriers 702 is sized substantially larger than the respective utility arm segment 332. For example, the equipment virtual barrier 702 may be approximately twice a radius of the respective utility arm segment 332. Alternatively, in some embodiments, the equipment virtual barriers 702 are more than twice a radius of the utility arm segments 332. Accordingly, the virtual barriers being extended past the physical structure of the utility arm segments 332 and other objects prevents unwanted collisions and allows overlays, alerts, and warnings to be displayed prior to contact of the remote assembly system 300 with other objects in the remote operating environment.

The equipment virtual barriers 702 may be configured to move in correspondence with the respective utility arm segment 332. For example, as a particular utility arm segment 332 is moved or rotated the equipment virtual barrier 702 may be moved within the virtual representation of the remote operating environment. For example, the virtual representation may include a spatial representation of the remote operating environment and may be stored, updated, and included on a control system of the remote assembly system 300.

In some embodiments, position and motion of the utility arm segments 332 and pivotable joints 334 is tracked and monitored using the Denavit-Hartenberg (D-H) convention to define transformations between links of the remote assembly system 300 such that the equipment virtual barriers 702 can be automatically updated based on movement of the remote assembly system 300. Alternatively, or additionally, in some embodiments, other conventions or approaches may be used to determine and track motion of the remote assembly system 300. For example, in some embodiments, the D-H approach may be modified or augmented with additional information to increase the accuracy of positioning of the virtual barriers. The D-H approach is generally used to determine a tool center point (TCP). However, some embodiments of the present disclosure contemplate adjusting one or more parameters of the D-H parameters with correction factors such that positions of intermediate joints may be determined. Accordingly, the virtual barriers may be positioned based on the modified D-H approach with correction factors to determine virtual barrier positions for intermediate joints of the utility arm 330, other portions of the remote assembly system 300, or boom assembly 104.

Figure 8:
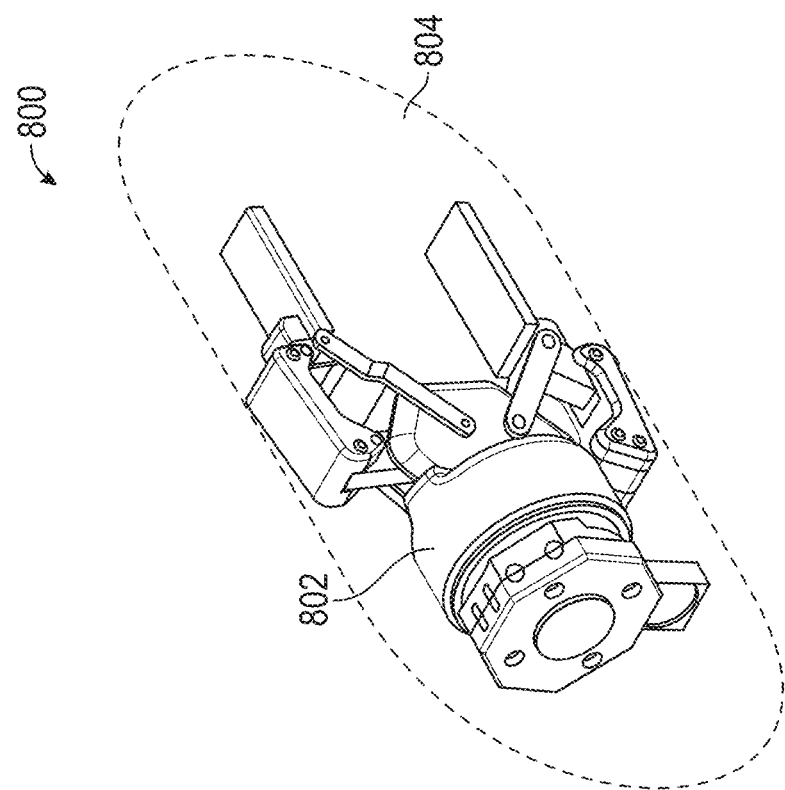
FIG. 8 illustrates an exemplary placement of a virtual barrier on a tool for the robot unit relating to some embodiments of the present disclosure referred to generally herein using reference numeral.

FIG. 8 illustrates an exemplary placement of a virtual barrier on a tool for the robot unit relating to some embodiments of the present disclosure referred to generally herein using reference numeral 800. In some embodiments, tool 802 is a tool adapted for use by the remote assembly system 300. For example, the tool 802 may be configured to be coupled to the distal end 336 of the utility arm 330. In some embodiments, the tool 802 comprises a gripper tool, as shown, operable to grip one or more objects in the remote operating environment. However, it should be understood that other tools are contemplated in addition to a gripper tool, the remote assembly system 300 may be operable to use a cutting tool, hot-stick tool, bonding tool, drilling tool, or other lineman tool, as well as other tools not explicitly described herein.

In some embodiments, a tool virtual barrier 804 is included for the tool 802. The tool virtual barrier 804 may be a tool-specific virtual barrier adapted for a specific type of tool 802. For example, in some embodiments, a different virtual barrier is included for each type of tool that the remote assembly system 300 uses. The size and shape of the tool virtual barrier 804 may be determined based at least in part based on a size of the tool, as well as, in some embodiments, an operation associated with the tool 802. For example, the tool virtual barrier 804 may be determined based on a maximum or fully extended size of the tool 802. As a specific example, the tool virtual barrier 804 for the gripper tool 802 may be sized to encompass a maximum extended size of the gripper tool 802 such as when the gripper tool is in a fully opened extended position. Alternatively, or additionally, in some embodiments, the tool virtual barrier 804 may be configured to change in size or shape as the tool is operated. For example, if the gripper tool is closed the tool virtual barrier 804 may be adjusted to reflect the closed position (i.e., the size or radius of the virtual barrier may be decreased).

Figure 9:
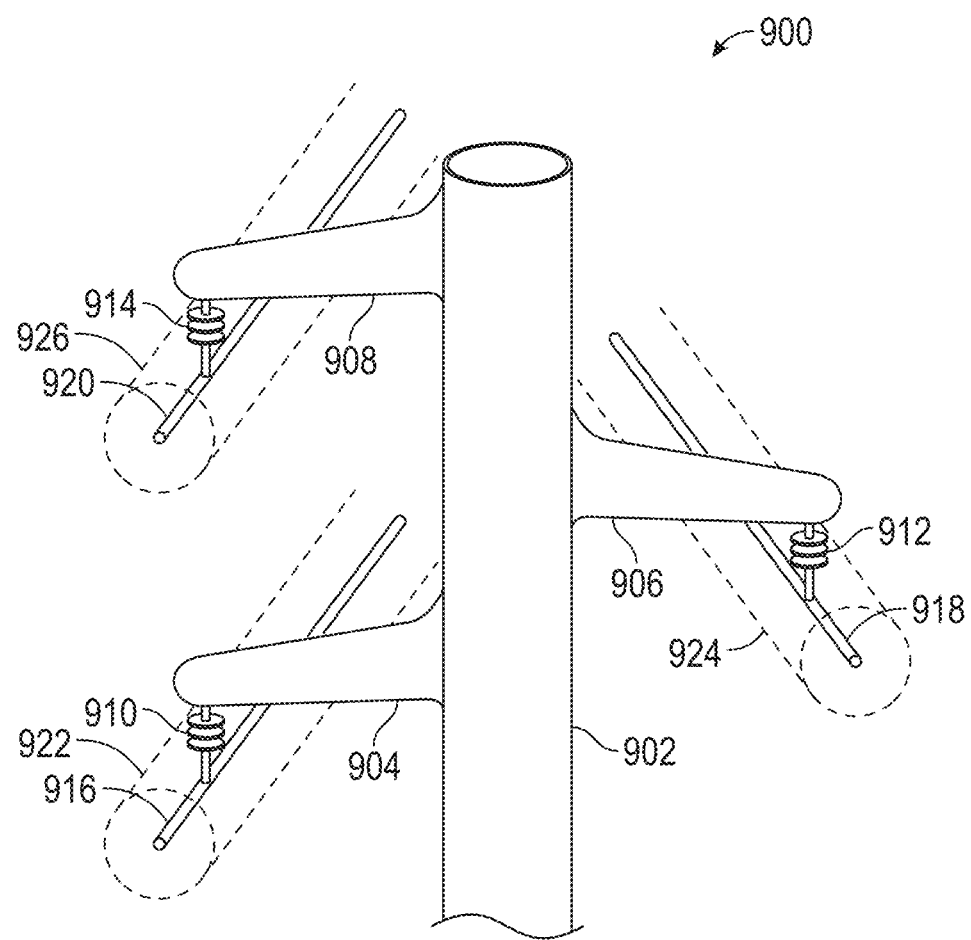
FIG. 9 illustrates an exemplary positioning of virtual barriers on a utility structure in an exemplary remote operating environment relating to some embodiments of the present disclosure.

FIG. 9 illustrates an exemplary positioning of virtual barriers on a utility structure in an exemplary remote operating environment 900 relating to some embodiments of the present disclosure. In some embodiments, FIG. 9 illustrates the exemplary remote operating environment 900 as seen from an operator interface such that one or more overlay elements are visible such as virtual barriers.

A utility pole 902 may be included within the remote operating environment 900, as shown. As described above with respect to the utility structure 502, the utility pole 902 may be configured to support one or more crossarms, such as a first crossarm 904, a second crossarm 906, and a third crossarm 908, as shown. In some embodiments, the crossarms are arranged in a staggered arrangement as shown. However, it should be understood that other crossarm arrangement are also contemplated such as any of a single-pole arrangement, a pole top arrangement, a single arm arrangement, a line arm arrangement, a side arms arrangement, as well as other utility structure arrangements not explicitly shown or described herein.

In some embodiments, each crossarm may include one or more insulators disposed thereon or coupled to the crossarm. For example, the first crossarm 904 may include a first insulator 910, the second crossarm 906 may include a second insulator 912, and the third crossarm 908 may include a third insulator 914. In some embodiments, each respective crossarm includes a pair of insulator with one insulator disposed on each side of the crossarm. Further, in some embodiments, each crossarm may be configured to support a respective utility line. For example, the first crossarm 904 may support a first utility line 916, the second crossarm 906 may support a second utility line 918, and the third crossarm 908 may support a third utility line 920. In some embodiments, the utility lines 916, 918, and 920 comprise power lines and in some cases, energized power lines. Further, in some embodiments, the utility lines 916, 918, and 920 include power lines with distinct voltage potentials. In some embodiments, each utility line is a different phase. For example, the utility pole 902 may be configured for three-phase power distribution with each respective utility line 916, 918, and 920 corresponding to a distinct phase.

In some embodiments, a virtual barrier is included for each utility line. For example, a first line virtual barrier 922 may be included for the first utility line 916, a second line virtual barrier 924 may be included for the utility line 918, and a third line virtual barrier 926 is included for the utility line 920. In some embodiments, the line virtual barriers 922, 924, and 926 include an indication of the specific phase or electrical potential of the respective utility line. For example, embodiments are contemplated in which two or more virtual barrier groups are included. For example, a first virtual barrier group may be associated with a first electrical potential, such as a first electrical phase associated with the first utility line 916 and a second virtual barrier group may be associated with a second electrical potential, such as a second electrical phase associated with the second utility line 918. Further, in some embodiments, a third virtual barrier group is contemplated for a third electrical phase associated with the third utility line 920.

In some embodiments, the line virtual barriers 922, 924, and 926, as well as other virtual barriers, are displayed within an operator interface based on a current electrical bonding state of the remote assembly system 300. For example, if the remote assembly system 300, or a portion thereof, is electrically bonded to the first utility line 916 the first line virtual barrier 922 may be suppressed from the operator interface but the line virtual barriers 924 and line virtual barriers 926 may be displayed because the second utility line 918 and the third utility line 920 are at different electrical potentials compared to the remote assembly system 300. Such a suppression and display may be toggled or updated responsive to a changing bonding condition. For example, as the remote assembly system 300 is electrically bonded to different electrical potentials the overlay elements may be updated to show or hide different virtual barriers. As such, embodiments are contemplated in which only virtual barriers for objects at different electrical potentials are displayed in the operator interface to prevent unintended contact between objects at different electrical potentials.

In some embodiments, the electrical bonding condition of the remote assembly system 300 may be determined automatically, for example, using a voltage sensor, a current sensor, or an electric field sensor. Alternatively, or additionally, the electrical bonding condition may be determined based on one or more manual inputs. For example, an operator may manually update an electrical bonding condition, such as within the operator interface. In some embodiments, the operator interface automatically requests an updated electrical bonding input from the operator in response to completing a bonding condition. Further still, in some embodiments, the electrical bonding condition may be automatically updated in response to a bonding operation of the remote assembly system 300 being completed.

In some embodiments, an electrical parameter such as a voltage corresponding to a particular virtual barrier is determined. For example, a voltage parameter may be determined and stored based on a measured, estimated, or provided voltage for the corresponding object that the virtual barrier represents. In some embodiments, the voltage for the objects in the remote operating environment are determined automatically, for example, using a voltage sensor or electric field sensor. Alternatively, or additionally, the voltage may be determined manually based on an operator input. Here, the operator interface may trigger a request for the operator to input a voltage value in response to a virtual barrier being generated. Alternatively, a voltage level may be requested during the placement and positioning of the virtual barrier. Further still, in some embodiments, a voltage of an object may be inferred using computer-vision or another suitable technique. For example, a voltage of a power line may be determined based on one or more voltage markings or visual indicators on or associated with the power line. Accordingly, embodiments are contemplated in which the overlay of the operator interface is adjusted based at least in part on a current electrical bonding condition of the remote assembly system 300, for example, to hide or show one or more virtual barriers. In some embodiments, one or more parameters of a respective virtual barrier may be determined or adjusted based on an electrical parameter. For example, a radius of a virtual barrier corresponding to a power line may be determined based on a voltage of the power line. In some embodiments, the virtual barrier radius may be determined proportional to the voltage of an object such that the radius is larger for objects with a relatively larger voltage.

In some embodiments, a position of the power line virtual barriers 922, 924, and 926 may be automatically updated responsive to a coupling of a respective power line with the remote assembly system 300. For example, the heavy utility arm 390 may be used to temporarily support and move a powerline. Accordingly, a virtual barrier of the power line may be automatically updated responsive to determining that the powerline has been moved with the heavy utility arm 390 or another portion of the remotely operated equipment.

Figure 10:
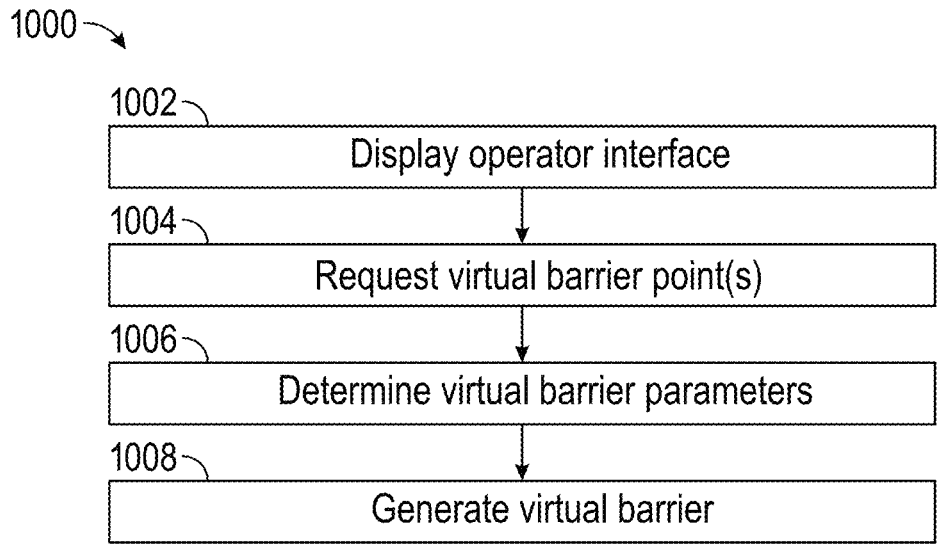
FIG. 10 illustrates an exemplary method of generating a virtual barrier for an object within a remote operating environment relating to some embodiments of the present disclosure.

FIG. 10 illustrates an exemplary method 1000 of generating a virtual barrier for an object within a remote operating environment relating to some embodiments of the present disclosure. In some embodiments, one or more steps of the method 1000, as well as the steps of other methods or operations described herein, may be performed using a non-transitory computer-readable media storing computer-executable instructions thereon that when executed by at least one processor or controller perform said steps or operations. For example, the computer-executable instructions may be executed on a processor of a control system of the aerial device 100 or the remote assembly system 300, such as, the control system 280.

At step 1002, an operator interface is displayed. For example, the operator interface may be displayed on one or more display devices associated with an operator, such as, a display of a head mounted device worn by the operator, a computer monitor display, or a display of a mobile device. In some embodiments, as described above, the operator interface may comprise a virtual reality interface or an augmented reality interface including real-time sensory information of the remote operating environment. In some embodiments, the operator interface is generated for display by a control system associated with the remote assembly system 300 or of a control system of the aerial device 100.

At step 1004, one or more virtual barrier points are requested from the operator. For example, a request or notification may be generated for display within the operator interface requesting one or more point inputs from the operator. For example, the operator interface may instruct the operator to place a first virtual barrier point to define a virtual barrier for an object within the remote operating environment. In some embodiments, a subsequent virtual barrier point may be requested from the operator, such as described above with respect to FIG. 6A.

At step 1006, one or more parameters for the virtual barrier are determined. For example, the one or more parameters may include any one of or combination of a radius, a length, a position, a shape, a voltage level, a virtual barrier group, as well as other virtual barrier parameters for defining the virtual barrier not explicitly described herein. In some embodiments, one or more parameters of the virtual barrier may be determined on one or more parameters of the object/objects the virtual barrier corresponds to. For example, the radius may be determined based at least in part on a voltage of the object, as described above.

At step 1008, the virtual barrier is generated within a control system associated with the remote assembly system 300. For example, the virtual barrier may be generated within a simulated spatial representation of the remote operating environment. As will be described in further detail below, the virtual barrier may be displayed within an operator interface associated with the remote assembly system 300.

Figure 11:
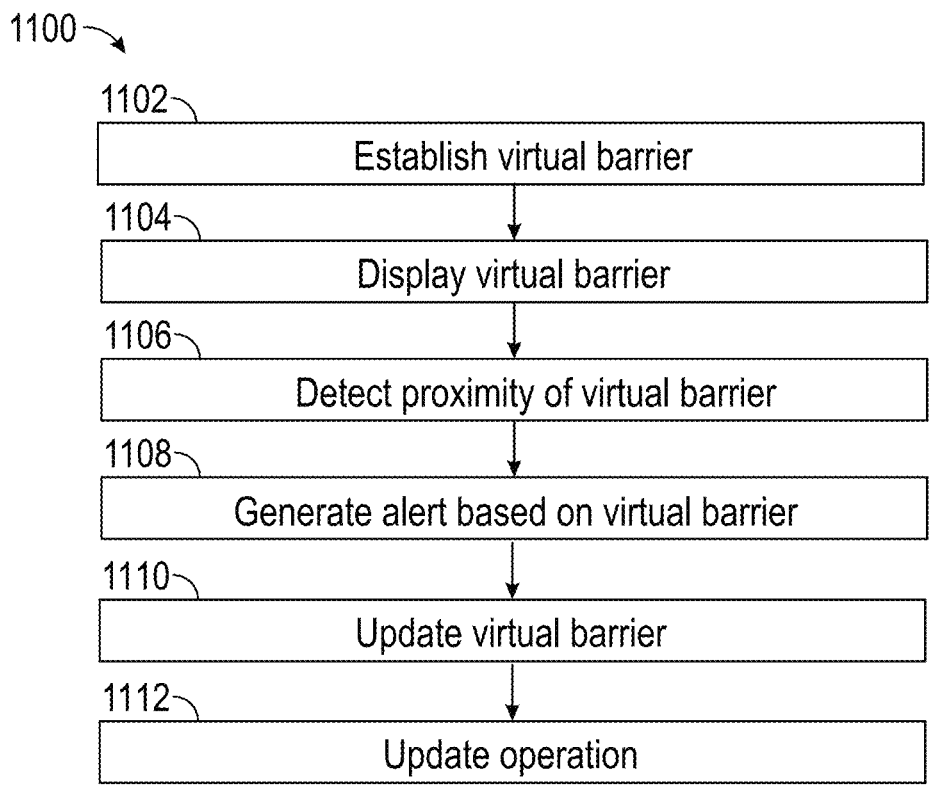
FIG. 11 illustrates an exemplary method of controlling remotely operated equipment based at least in part on one or more virtual barriers relating to some embodiments of the present disclosure.

FIG. 11 illustrates an exemplary method 1100 of controlling remotely operated equipment based at least in part on one or more virtual barriers relating to some embodiments of the present disclosure. Similar to method 1000, as described above, at least a portion of the steps of method 1100 may be performed by executing computer-readable instructions stored on one or more non-transitory computer-readable media on at least one processor of a control system associated with the remote assembly system 300.

At step 1102, one or more virtual barriers are established within an operator interface associated with the remote assembly system 300. In some embodiments, at least one virtual barrier is established manually based on one or more operator inputs, as described above, such as in method 1000. Alternatively, or additionally, in some embodiments, at least one virtual barrier is established using automated techniques. For example, a computer-vision technique or machine learning model may be used to determine one or more virtual barrier parameters and define a virtual barrier. For example, in some embodiments, a machine learning model may be used to identify an object based on image data from a camera in the remote operating environment and a virtual barrier may be automatically defined for the object using the machine learning model. Further, embodiments are contemplated in which a combination of different techniques are used to establish virtual barriers. For example, in some embodiments, one or more virtual barriers may be established automatically. The virtual barriers may then be updated or confirmed based on manual operator input.

In some embodiments, a 3D depth camera may be used to define virtual barriers for an object based on manual operator input. For example, a reticle may be generated for display within the operator interface such that the operator is able to position the reticle within the interface within the display to select one or more points. The 3D depth camera may be used to correlate the selected reticle positions with 3 dimensional coordinates within the virtual representation of the remote operating environment and the coordinates may be used to define one or more virtual barriers. Additionally, or alternatively, in some embodiments, other forms of vision-based sensors are used to provide object recognition and location, such as any of a depth camera, a LIDAR sensor, as well as machine learning image recognition paired with a traditional camera.

At step 1104, the one or more virtual barriers are displayed within the operator interface. In some embodiments, display of the virtual barriers may be conditional based on operating information. For example, in some embodiments, only a portion of the virtual barriers are displayed based on an electrical bonding state, or another operational state of the remote assembly system 300. Additionally, or alternatively, in some embodiments, display of a virtual barrier may be responsive to a proximity, collision, or other interaction of the virtual barrier such as a portion of the remote assembly system 300 passing through the virtual barrier.

At step 1106, a proximity to one or more virtual barriers is detected. In some embodiments, the proximity is determined relative to at least a portion of the remote assembly system 300 or to equipment virtual barriers thereof. For example, in some embodiments, the proximity is detected based on a simulated representation of the remote operating environment. Here, the position of the remotely operated equipment i.e., the remote assembly system 300 including the utility arm 330$a$, the utility arms 330$b$, and the heavy utility arm 390, as well as the position of the aerial device 100. In some embodiments, the entire assembly of the aerial device 100 is represented spatially within the simulated representation to track motion of the equipment within the remote operating environment. As mentioned above, a base portion of the aerial device 100 may be used as an origin point within the simulated representation such that the position of portions of the remote assembly system 300 may be determined based on a sequence of joint angles and known segment lengths of the equipment tracing back to the origin point. For example, in some embodiments, forward kinematics is used to determine positions of various objects and equipment within the remote operating environment with the equipment base as an origin or reference point. In some embodiments, forward kinematics and/or the D-H approach may be used to determine a selection point corresponding to the position of the end of the picker tool 602. Because the length and geometry of the picker tool 602 is known, the geometry and pose of the remotely operated equipment may be mapped from the origin point to determine the coordinates of the end of the picker tool 602. As such, complicated sensors and devices are not needed on the picker tool 602 and the picker tool 602 may comprise a non-conductive rod with no electrical devices or sensory equipment thereon.

The positioning of virtual barriers for objects in the remote operating environment may be stored within a memory associated with the remote assembly system 300. Further, in some embodiments, the positioning and other parameters of the virtual barriers may be updated automatically or manually within the memory. For example, in some embodiments, virtual barrier parameters may be updated based on computer-vision techniques. As a specific example, a positioning of a virtual barrier for a power line may be automatically updated responsive to detecting, using computer-vision, that the power line is moved.

At step 1108, an alert is generated based on one or more virtual barriers. For example, in some embodiments, an alert may be generated responsive to a collision, proximity change, or other interaction with a virtual barrier. The alert may include any one of or combinations of a notification to an operator, transmission of a control signal, updating of display of the virtual barrier, or updating one or more operations.

In some embodiments, at step 1110, one or more virtual barriers are updated within the operator interface. In some embodiments, a virtual barrier is updated responsive to the alert from step 1108. For example, in some embodiments, a particular virtual barrier may be displayed responsive to a proximity or collision with the respective barrier. Further, embodiments are contemplated in which the virtual barrier is already displayed in general or when a portion of the remote assembly system 300 is within a predetermined threshold distance from the virtual barrier, but the display of the virtual barrier is updated responsive to collision with the virtual barrier, such as by causing the virtual barrier to flash or otherwise, increasing the visibility of the virtual barrier within the operator interface overlay. In some embodiments, for example, an alpha level for a virtual barrier may be updated responsive to a proximity of the remote assembly system 300 to the virtual barrier. For example, the alpha level may increase as the remote assembly system 300, or a portion thereof, moves closure to the virtual barrier.

In some embodiments, display of one or more virtual barriers may be updated and adjusted based on a manual operator input. For example, embodiments are contemplated in which the operator may select from a list of overlay options for the operator interface, such as any of, showing all virtual barriers, showing some virtual barriers, showing no virtual barriers, showing only object virtual barriers, showing only equipment virtual barriers, or other overlay options not explicitly described herein. Further, in some embodiments, the operator may select an overlay option to completely or partially suppress the overlay within the operator interface to focus on the remote operating environment without the overlay over the imagery. Further still, in some embodiments, the overlay options may be updated automatically, for example, based on a state of the remotely operated equipment or another condition or parameter of the remote operating environment.

In some embodiments, at step 1112, one or more operations of the remote assembly system 300 are updated. In some embodiments, an operation is updated responsive to the alert from step 1108. For example, updating an operation may include any of preventing a motion of the remote assembly system 300 or of the boom assembly 104, rerouting/redirecting a motion, pausing/halting operation of the remote assembly system 300 or boom assembly 104 pending an override, or modifying another operation of the remote assembly system 300 or boom assembly 104.

Further, in some embodiments, an alert or response may be generated responsive to interaction between equipment virtual barriers. For example, in some embodiments, motion of the heavy utility arm 390 may be halted responsive to detecting an interaction, collision, or minimum proximity between a virtual barrier of the heavy utility arm 390 and a virtual barrier of one of the utility arms 330*a* or 330*b*, or another portion of the remote assembly system 300.

The virtual barriers are described herein with respect to preventing collisions with the remote assembly system 300. However, it should be understood that embodiments are also contemplated to prevent collision and trigger alerts with respect to other equipment. For example, in some embodiments, virtual barriers are tracked to prevent collision and to trigger alerts based on motion of the boom assembly 104. Further, embodiments are contemplated in which virtual barriers are used during manual operation, for example, while an operator is present in a utility platform attached at a distal end of the boom assembly 104.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY", now U.S. Pat. No. 11,794,359; U.S. application Ser. No. 17/875,710, titled "AUTONOMOUS AND SEMI-AUTONOMOUS CONTROL OF AERIAL ROBOTIC SYSTEMS", now U.S. Pat. No. 11,660,750; U.S. application Ser. No. 17/875,743, titled "COORERATIVE HIGH-CAPACITY AND HIGH-DEXTERITY MANIPULATORS", now U.S. Pat. No. 11,717,969; U.S. application Ser. No. 17/875,796, titled "ROTARY TOOL FOR REMOTE POWER LINE OPERATIONS", now U.S. Pat. No. 11,839,962; U.S. application Ser. No. 17/875,821, titled "OPERATION AND INSULATION TECHNIQUES", now U.S. Pat. No. 11,742,108; and U.S. application Ser. No. 17/875,893, titled "COORDINATE MAPPING FOR MOTION CONTROL", now U.S. Pat. No. 11,697,209. The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

U.S. patent application Ser. No. 18/927,001 entitled "INTUITIVE VIRTUAL REALITY INTERFACE FOR CONTROLLING ROBOTS" and filed Oct. 25, 2024, is also hereby incorporated by reference in its entirety as if set forth herein verbatim. The subject matter described in the foregoing U.S. patent application may be combined with the subject matter of the present disclosure. For example, one or more embodiments, features, structures, acts, etc. described in the foregoing U.S. patent application may be combined with one or more embodiments, features, structures, acts, etc. described in the present disclosure. As a specific example, the intuitive virtual reality interface described therein may be employed to select virtual barriers, place virtual barriers, update virtual barriers, respond to virtual barrier interactions, coach an operator through placing a virtual barrier, coaching an operator to move away from a virtual barrier, or to perform another interface operation described herein.

Clause 1. A method of establishing virtual barriers within a control system of a remotely operated robotic device, the remotely operated robotic device disposed in a remote operating environment remote from an operator, the method comprising: identifying at least one position within the remote operating environment, the at least one position associated with an object in the remote operating environment; generating at least one virtual barrier associated with the object within the control system of the remotely operated robotic device based on the at least one position within the remote operating environment; generating an alert in response to a proximity of a portion of the remotely operated robotic device to the at least one virtual barrier; and selectively displaying a visual representation of the at least one virtual barrier to the operator as an overlay within an operator interface.

Clause 2. The method of clause 1, further comprising: responsive to the proximity of the portion of the remotely operated robotic device to the at least one virtual barrier preventing or redirecting one or more motions of the remotely operated robotic device.

Clause 3. The method of clause 1, wherein the at least one position is identified using at least one vision-based sensor disposed in the remote operating environment.

Clause 4. The method of clause 1, wherein the at least one virtual barrier comprises a capsule shape defined by a line segment and a radius.

Clause 5. The method of clause 1, further comprising: generating a tool-specific virtual barrier within the control system corresponding to a tool coupled to the remotely operated robotic device based on a tool type of the tool.

Clause 6. The method of clause 1, wherein the remotely operated robotic device comprises a robotic assembly including: a base portion; one or more robotic arms coupled to the base portion; and a heavy utility arm larger than the one or more robotic arms.

Clause 7. The method of clause 6, further comprising: generating one or more virtual robotic arm barriers corresponding to the one or more robotic arms respectively; generating a virtual heavy utility arm barrier corresponding to the heavy utility arm; and halting motion of the heavy utility arm responsive to a proximity of the virtual heavy utility arm barrier to the one or more virtual robotic arm barriers.

Clause 8. The method of clause 6, wherein the at least one position is identified via a picker tool held by the one or more robotic arms.

Clause 9. One or more non-transitory computer-readable media storing computer-executable instructions that, when executed by at least one processor, perform a method of establishing virtual barriers within a control system of a remotely operated robotic device, the remotely operated robotic device disposed in a remote operating environment remote from an operator, the method comprising: receiving one or more operator inputs from the operator, the one or more operator inputs indicative of at least one position within the remote operating environment, the at least one position associated with an object disposed in the remote operating environment; generating at least one virtual barrier within the control system of the remotely operated robotic device based on the at least one position within the remote operating environment, the at least one virtual barrier corresponding to the object disposed in the remote operating environment; generating an alert in response to a proximity of a portion of the remotely operated robotic device to the at least one virtual barrier; and selectively generating a visual representation of the at least one virtual barrier displayed to the operator as an overlay within an operator interface.

Clause 10. The one or more non-transitory computer-readable media of clause 9, wherein the remotely operated robotic device comprises a robotic assembly including one or more robotic arms operable to be controlled by the operator.

Clause 11. The one or more non-transitory computer-readable media of clause 10, wherein the one or more robotic arms are configured to hold a picker tool and the one or more operator inputs include positioning the picker tool using the one or more robotic arms and a selection of an endpoint position within the remote operating environment corresponding to an end of the picker tool.

Clause 12. The one or more non-transitory computer-readable media of clause 9, wherein the method further comprises: responsive to collision of the remotely operated robotic device with the at least one virtual barrier, preventing further motion toward the object.

Clause 13. The one or more non-transitory computer-readable media of clause 12, wherein the method further comprises: responsive to collision of the remotely operated robotic device with the at least one virtual barrier, allowing motion away from the object.

Clause 14. The one or more non-transitory computer-readable media of clause 9, wherein the method further comprises: transmitting haptic feedback to an input device of the operator responsive to a proximity of a portion of the remotely operated robotic device to the at least one virtual barrier.

Clause 15. A method of establishing virtual barriers within a control system of a remotely operated robotic device, the remotely operated robotic device disposed in a remote operating environment remote from an operator, the method comprising: generating a first virtual barrier within the control system of the remotely operated robotic device, the first virtual barrier corresponding to a first object disposed in the remote operating environment; generating a second virtual barrier within the control system, the second virtual barrier corresponding to a second object disposed in the remote operating environment; generating one or more virtual equipment barriers within the control system, the one or more virtual equipment barriers corresponding to respective portions of the remotely operated robotic device; while the remotely operated robotic device is in a first electrical bonding state, monitoring position of the one or more virtual equipment barriers relative to the first virtual barrier as the respective portions of the remotely operated robotic device move within the remote operating environment; and while the remotely operated robotic device is in a second electrical bonding state, monitoring position of the one or more virtual equipment barriers relative to the second virtual barrier as the respective portions of the remotely operated robotic device move within the remote operating environment.

Clause 16. The method of clause 15, further comprising: generating an alert in response to the one or more virtual equipment barriers passing through one of the first virtual barrier or the second virtual barrier.

Clause 17. The method of clause 16, wherein the alert includes a visual representation of the first virtual barrier displayed to the operator as an overlay within an operator interface.

Clause 18. The method of clause 17, wherein the operator interface is displayed within a head-mounted display device worn by the operator.

Clause 19. The method of clause 15, further comprising: prior to generating the first virtual barrier, automatically identifying a position of the first object using a machine learning model and images from a camera; and prior to generating the second virtual barrier, automatically identifying a position of the second object using the machine learning model and images from the camera.

Clause 20. The method of clause 19, wherein the remote operating environment is in proximity to a utility pole and the first object is an energized power line.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of establishing virtual barriers within a control system of a remotely operated robotic device, the remotely operated robotic device disposed in a remote operating environment remote from an operator, the method comprising:
- identifying at least one position within the remote operating environment, the at least one position associated with an object in the remote operating environment;
- generating at least one virtual barrier associated with the object within the control system of the remotely operated robotic device based on the at least one position within the remote operating environment,
- wherein the at least one virtual barrier comprises a radius determined based at least in part on a voltage of the object;
- generating an alert in response to a proximity of a portion of the remotely operated robotic device to the at least one virtual barrier; and
- responsive to the proximity of the portion of the remotely operated robotic device to the at least one virtual barrier, selectively displaying a visual representation of the at least one virtual barrier to the operator as an overlay displayed over a real-time image of the remote operating environment within an operator interface of a remote control device.

2. The method of claim 1, further comprising:
responsive to the proximity of the portion of the remotely operated robotic device to the at least one virtual barrier preventing or redirecting one or more motions of the remotely operated robotic device.

3. The method of claim 1, wherein the at least one position is identified using at least one vision-based sensor disposed in the remote operating environment.

4. The method of claim 1, wherein the at least one virtual barrier comprises a capsule shape defined by a line segment and the radius, wherein the line segment is determined based on the at least one position and the radius is determined based further in part on a type of the object.

5. The method of claim 1, further comprising:
generating a tool-specific virtual barrier within the control system corresponding to a tool coupled to the remotely operated robotic device based on a tool type of the tool.

6. The method of claim 1, wherein the remotely operated robotic device comprises a robotic assembly including:
- a base portion;
- one or more robotic arms coupled to the base portion; and
- a heavy utility arm larger than the one or more robotic arms.

7. The method of claim 6, further comprising:
- generating one or more virtual robotic arm barriers corresponding to the one or more robotic arms respectively;
- generating a virtual heavy utility arm barrier corresponding to the heavy utility arm; and
- halting motion of the heavy utility arm responsive to a proximity of the virtual heavy utility arm barrier to the one or more virtual robotic arm barriers.

8. The method of claim 6, wherein the at least one position is identified via a picker tool held by the one or more robotic arms based on an end position of a distal end of the picker tool.

9. One or more non-transitory computer-readable media storing computer-executable instructions that, when executed by at least one processor, perform a method of establishing virtual barriers within a control system of a remotely operated robotic device, the remotely operated robotic device disposed in a remote operating environment remote from an operator and comprising a robotic assembly including one or more robotic arms operable to be controlled by the operator, the method comprising:
- receiving one or more operator inputs from the operator, the one or more operator inputs indicative of at least one position within the remote operating environment, the at least one position associated with an object disposed in the remote operating environment;
- generating at least one virtual barrier within the control system of the remotely operated robotic device based on the at least one position within the remote operating environment, the at least one virtual barrier corresponding to the object disposed in the remote operating environment;
- generating an alert in response to a proximity of a portion of the remotely operated robotic device to the at least one virtual barrier; and
- responsive to the proximity of the portion of the remotely operated robotic device to the at least one virtual barrier, selectively generating a visual representation of the at least one virtual barrier displayed to the operator as an overlay displayed over a real-time image of the remote operating environment within an operator interface,
- wherein the one or more robotic arms are configured to hold a picker tool and the one or more operator inputs include positioning the picker tool using the one or more robotic arms and a selection of an endpoint position within the remote operating environment corresponding to an end of the picker tool.

10. The one or more non-transitory computer-readable media of claim 9, wherein the method further comprises:
responsive to collision of the remotely operated robotic device with the at least one virtual barrier, preventing further motion toward the object and allowing motion away from the object.

11. The one or more non-transitory computer-readable media of claim 9, wherein the method further comprises:
transmitting haptic feedback to an input device of the operator responsive to the proximity of the portion of the remotely operated robotic device to the at least one virtual barrier.

12. A method of establishing virtual barriers within a control system of a remotely operated robotic device, the remotely operated robotic device disposed in a remote operating environment remote from an operator, the method comprising:
- generating a first virtual barrier within the control system of the remotely operated robotic device, the first virtual barrier corresponding to a first object disposed in the remote operating environment;
- generating a second virtual barrier within the control system, the second virtual barrier corresponding to a second object disposed in the remote operating environment;
- generating one or more virtual equipment barriers within the control system, the one or more virtual equipment barriers corresponding to respective portions of the remotely operated robotic device;
- responsive to determining that the remotely operated robotic device is in a first electrical bonding state, monitoring position of the one or more virtual equipment barriers relative to the first virtual barrier as the respective portions of the remotely operated robotic device move within the remote operating environment; and
- responsive to determining that the remotely operated robotic device is in a second electrical bonding state, monitoring position of the one or more virtual equipment barriers relative to the second virtual barrier as the respective portions of the remotely operated robotic device move within the remote operating environment.

13. The method of claim 12, further comprising:
generating an alert in response to the one or more virtual equipment barriers passing through one of the first virtual barrier or the second virtual barrier.

14. The method of claim 13, wherein the alert includes a visual representation of the first virtual barrier displayed to the operator as an overlay displayed over a real-time image of the remote operating environment within an operator interface.

15. The method of claim 14, wherein the operator interface is displayed within a head-mounted display device worn by the operator.

16. The method of claim 12, further comprising:
prior to generating the first virtual barrier, automatically identifying a position of the first object using a machine learning model and images from a camera; and
prior to generating the second virtual barrier, automatically identifying a position of the second object using the machine learning model and images from the camera.

17. The method of claim 16, wherein the remote operating environment is in proximity to a utility pole and the first object is an energized power line.

18. The method of claim 14, further comprising:
generating one or more operator instructions for display within the operator interface, the one or more operator instructions requesting one or more actions from the operator.

* * * * *